US011892669B2

(12) United States Patent
Yoon et al.

(10) Patent No.: US 11,892,669 B2
(45) Date of Patent: Feb. 6, 2024

(54) POLARIZING PLATE AND DISPLAY DEVICE

(71) Applicant: LG CHEM, LTD., Seoul (KR)

(72) Inventors: Hyuk Yoon, Daejeon (KR); Jun Won Chang, Daejeon (KR); Jong Hyun Jung, Daejeon (KR); Sun Kug Kim, Daejeon (KR); Moon Soo Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 337 days.

(21) Appl. No.: 17/262,498

(22) PCT Filed: Nov. 4, 2019

(86) PCT No.: PCT/KR2019/014799
§ 371 (c)(1),
(2) Date: Jan. 22, 2021

(87) PCT Pub. No.: WO2020/091550
PCT Pub. Date: May 7, 2020

(65) Prior Publication Data
US 2021/0302638 A1   Sep. 30, 2021

(30) Foreign Application Priority Data

Nov. 2, 2018 (KR) .................. 10-2018-0133684

(51) Int. Cl.
*G02B 5/30* (2006.01)
*C08F 222/24* (2006.01)
(Continued)

(52) U.S. Cl.
CPC .......... *G02B 5/3016* (2013.01); *C08F 222/24* (2013.01); *C09K 19/3497* (2013.01);
(Continued)

(58) Field of Classification Search
CPC .............. C08F 222/24; C09K 19/3497; C09K 2019/0448; C09K 2323/035; G02B 1/04;
(Continued)

(56) References Cited

U.S. PATENT DOCUMENTS

2009/0085019 A1* 4/2009 Buhler ................ C08K 5/3475
252/589
2009/0109385 A1   4/2009 Nagase et al.
(Continued)

FOREIGN PATENT DOCUMENTS

CN   101836138 A   9/2010
CN   107108775 A   8/2017
(Continued)

*Primary Examiner* — Sophie Hon
*Assistant Examiner* — Sow-Fun Hon
(74) *Attorney, Agent, or Firm* — Bryan Cave Leighton Paisner LLP

(57) ABSTRACT

A polarizing plate and a display device including the same. The polarizing plate includes a retardation layer exhibiting ultraviolet blocking characteristics even in a state where the retardation layer does not include any ultraviolet absorber or light stabilizer. The polarizing plate can be used alone or in combination with an appropriate sunscreen or a light stabilizer as needed to selectively block ultraviolet rays in a region requiring blocking, without affecting display performance, such as color senses and image quality, of a display device. The polarizing plate can also be formed with a small thickness without requiring a separate ultraviolet blocking layer, and also has excellent durability, because the polarizing plate exhibits a certain ultraviolet blocking property even in the absence of an ultraviolet absorber or light stabilizer.

10 Claims, 6 Drawing Sheets

(51) Int. Cl.
*C09K 19/38* (2006.01)
*C09K 19/34* (2006.01)
*G02F 1/1345* (2006.01)
*G02F 1/1335* (2006.01)
*G02F 1/13363* (2006.01)
*C09K 19/04* (2006.01)

(52) U.S. Cl.
CPC ........ *C09K 19/3861* (2013.01); *G02F 1/1345* (2013.01); *G02F 1/13363* (2013.01); *G02F 1/13452* (2013.01); *G02F 1/133528* (2013.01); *C09K 2019/0448* (2013.01); *C09K 2323/035* (2020.08); *G02B 5/3083* (2013.01)

(58) Field of Classification Search
CPC ................ G02B 5/3083; G02B 5/3016; G02F 1/13363; G02F 1/133528; C08L 101/12
See application file for complete search history.

(56) References Cited

U.S. PATENT DOCUMENTS

| | | | |
|---|---|---|---|
| 2013/0208197 A1 | 8/2013 | Kim et al. | |
| 2017/0184767 A1 | 6/2017 | Hatanaka et al. | |
| 2017/0235032 A1 | 8/2017 | Miyazaki | |
| 2018/0002460 A1* | 1/2018 | Endo | C08F 2/50 |

FOREIGN PATENT DOCUMENTS

| | | | | | |
|---|---|---|---|---|---|
| CN | 107922535 A | | 4/2018 | | |
| CN | 112585510 B | * | 11/2022 | ............ | C08F 222/24 |
| EP | 3345939 A1 | | 7/2018 | | |
| JP | 2013-160775 A | | 8/2013 | | |
| JP | 2014-533376 A | | 12/2014 | | |
| JP | 2017054093 A | | 3/2017 | | |
| JP | 7205981 B2 | * | 1/2023 | ............ | C08F 222/24 |
| KR | 10-2007-0087593 A | | 8/2007 | | |
| KR | 10-2010-0072038 A | | 6/2010 | | |
| KR | 10-1053808 B1 | | 8/2011 | | |
| KR | 10-2016-0051506 A | | 5/2016 | | |
| KR | 10-2017-0105015 A | | 9/2017 | | |
| KR | 10-2018-0048837 A | | 5/2018 | | |
| KR | 1020180087871 | | 8/2018 | | |
| KR | 10-2018-0114123 A | | 10/2018 | | |
| KR | 102466771 B1 | * | 11/2022 | ............ | C08F 222/24 |
| TW | I717085 B | * | 1/2021 | ............ | C08F 222/24 |
| WO | 2009054204 A1 | | 4/2009 | | |
| WO | 2015/046399 A1 | | 4/2015 | | |
| WO | 2016114253 A1 | | 7/2016 | | |
| WO | 2016114255 A1 | | 7/2016 | | |
| WO | 2017038265 A1 | | 3/2017 | | |
| WO | 2018101196 A1 | | 6/2018 | | |
| WO | 2018101250 A1 | | 6/2018 | | |
| WO | 2018173778 A1 | | 9/2018 | | |
| WO | 2018/186472 A1 | | 10/2018 | | |

\* cited by examiner

[Figure 1]
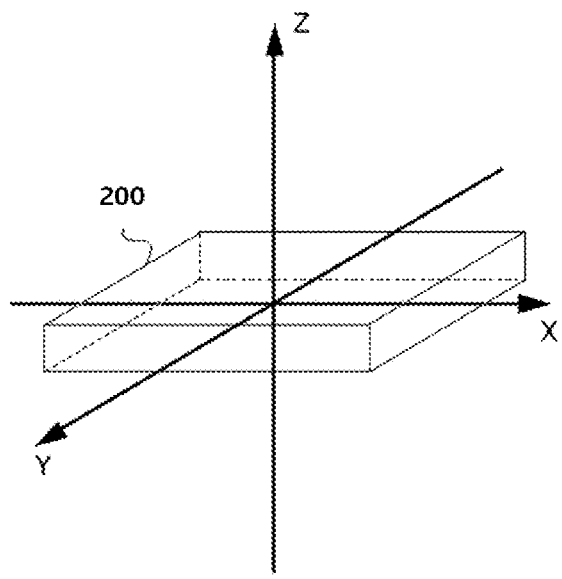
[Figure 2]
[Figure 3]

[Figure 4]
[Figure 5]
[Figure 6]
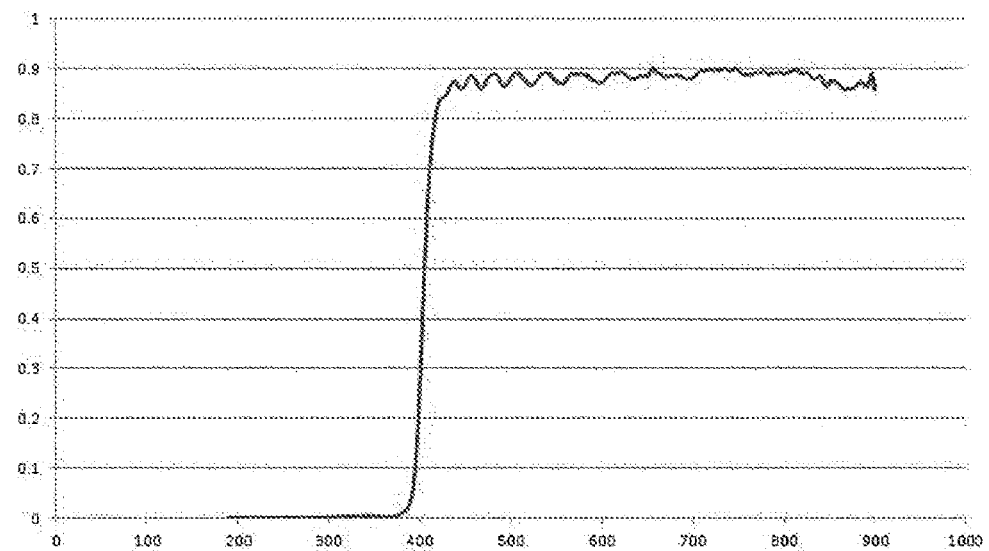

[Figure 7]
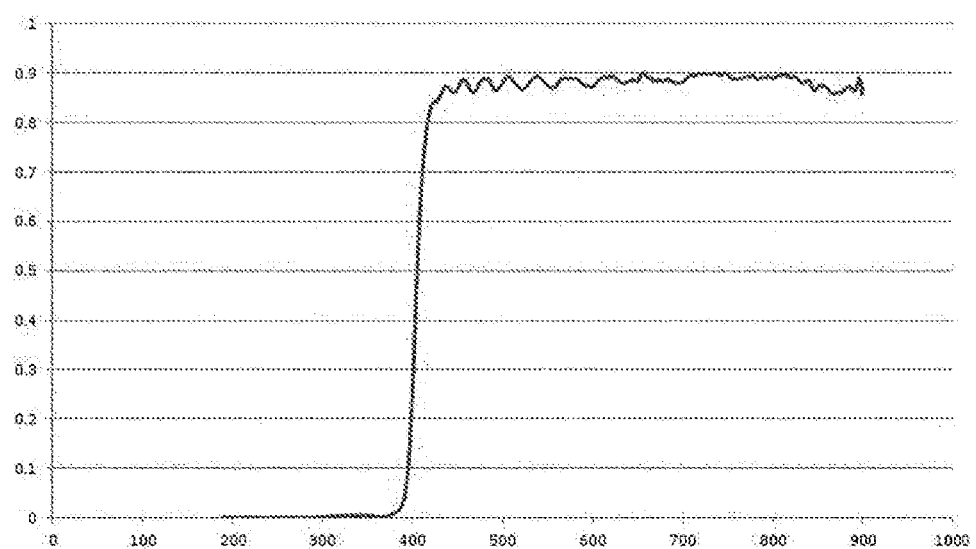

[Figure 8]
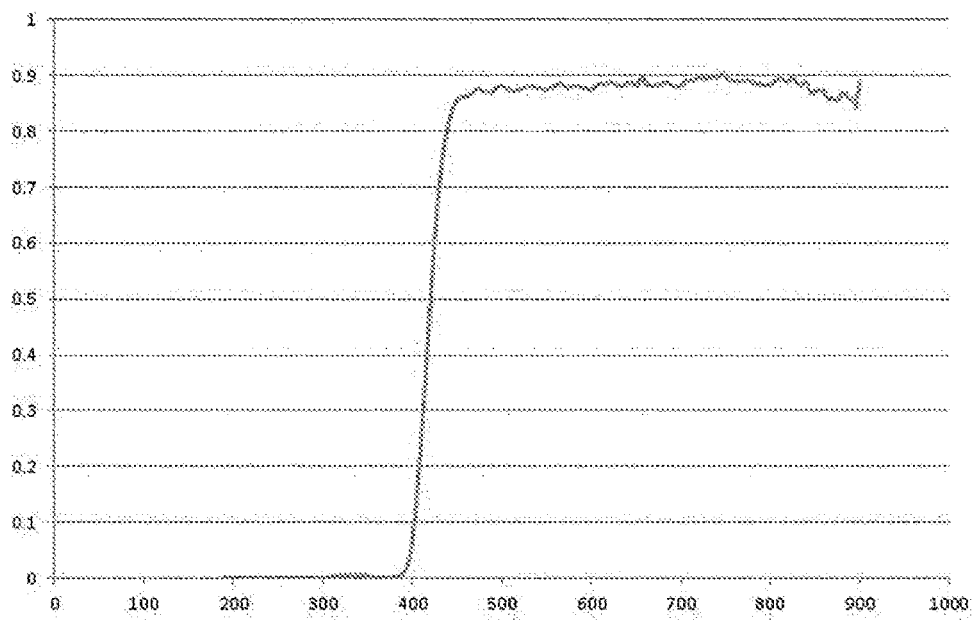
[Figure 9]
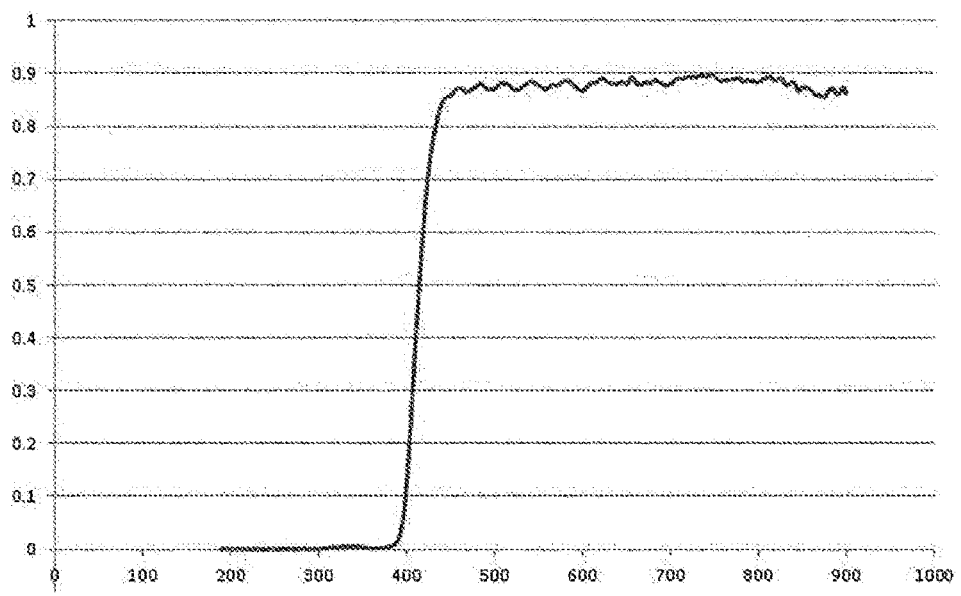

[Figure 10]
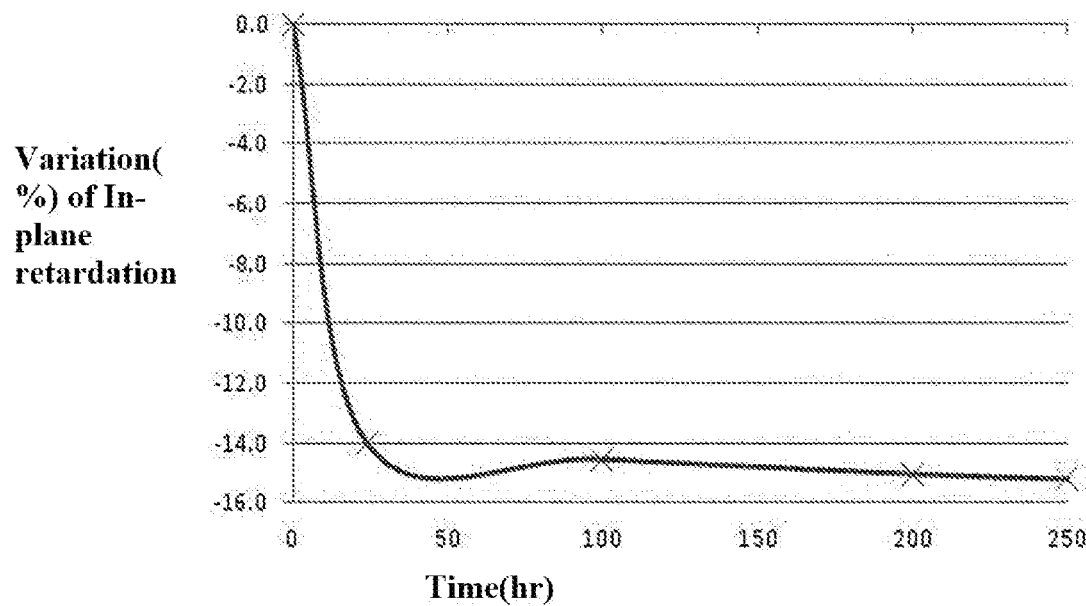
[Figure 11]
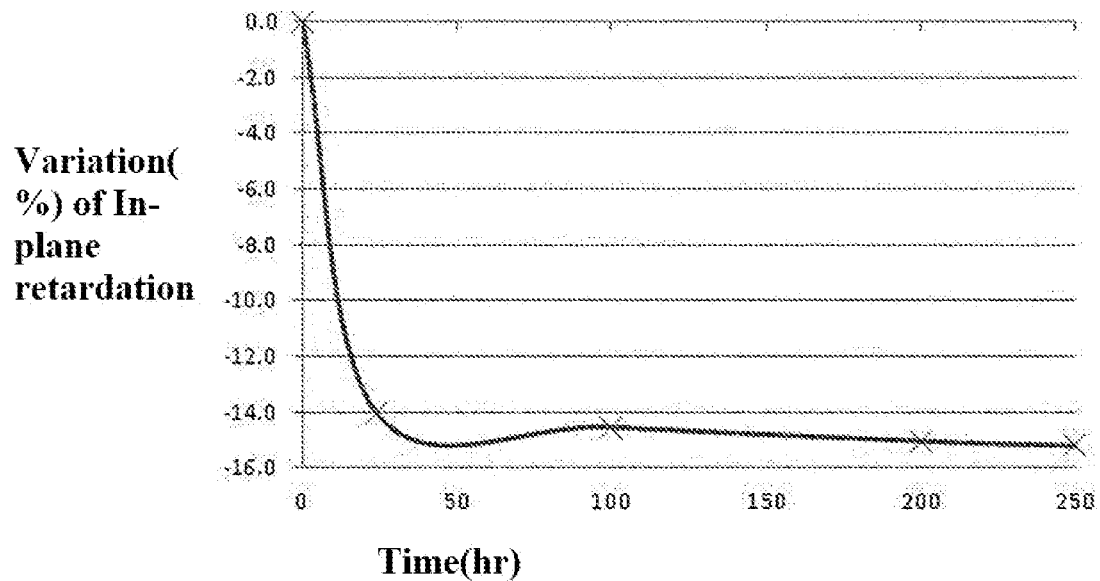

[Figure 12]
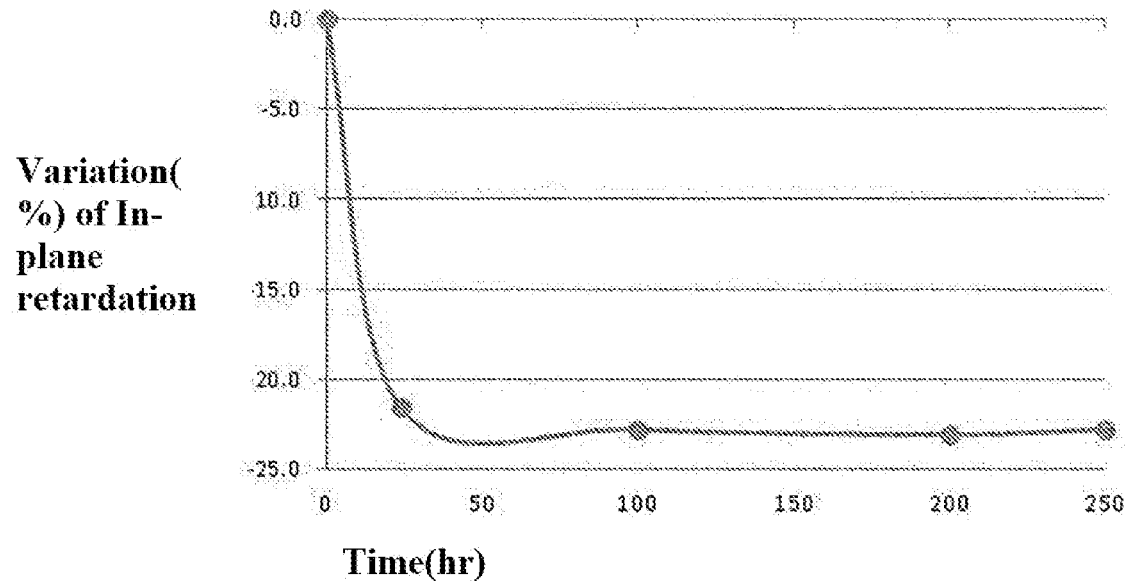
[Figure 13]
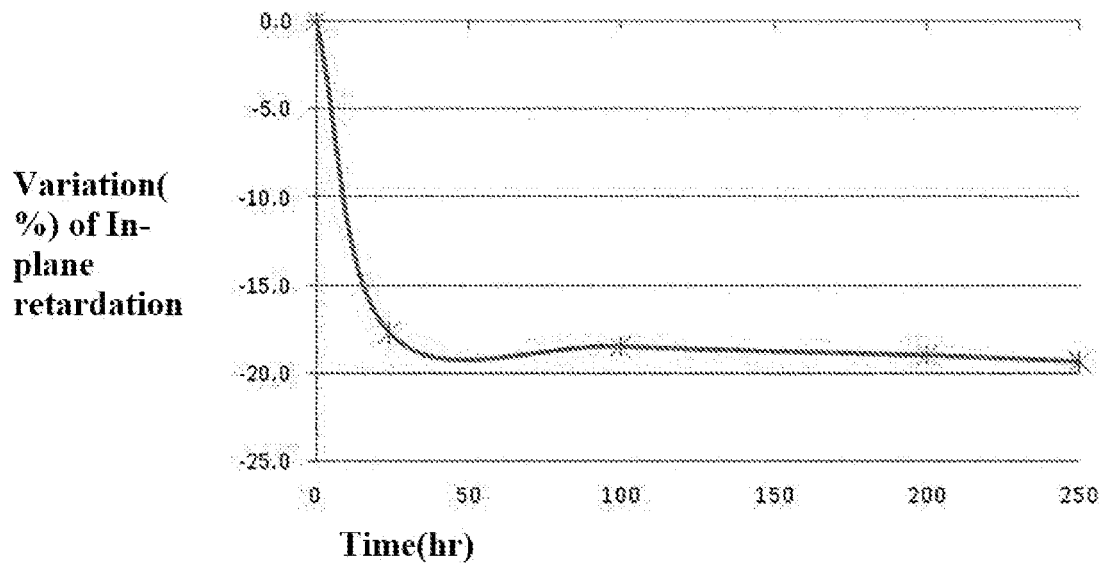

POLARIZING PLATE AND DISPLAY DEVICE

CROSS-REFERENCE TO RELATED APPLICATIONS

This application is a U.S. national stage of international Application No. PCT/KR2019/014799 filed on Nov. 4, 2020, and claims priority based on Korean Patent Application No. 10-2018-0133684 filed on Nov. 2, 2018, the disclosures of which are incorporated herein by reference in their entirety.

TECHNICAL FIELD

The present application relates to a polarizing plate and a display device.

BACKGROUND ART

In many cases, optical films included in display devices require ultraviolet blocking properties for durability of the optical films themselves or protection of display elements, and the like. For this reason, ultraviolet absorbers or light stabilizers are introduced into many optical films.

Commercially available ultraviolet absorbers or light stabilizers can effectively block ultraviolet rays having a wavelength of less than approximately 380 nm, but the blocking efficiency against ultraviolet rays having a wavelength of 380 nm or more is lowered. In addition, although ultraviolet absorbers or light stabilizers capable of partially blocking or absorbing ultraviolet rays having a wavelength of 380 nm or more are known, such ultraviolet absorbers or light stabilizers absorb or block short wavelengths belonging to the visible light region as well, and thus also absorb or block a portion of the visible light region displayed in the display device, thereby adversely affecting image quality such as color senses.

On the other hand, since the ultraviolet absorber or light stabilizer is an additive, there may be a problem when it is included in an optical film. For example, when the orientation of the polymerizable liquid crystal produces a retardation layer, the ultraviolet absorber or light stabilizer is included in the relevant layer, whereby the orientation of the liquid crystal compound may be lowered. In addition, since most of the polymerizable liquid crystal compounds are ultraviolet polymerizable, the polymerization may not be performed properly when the polymerizable liquid crystals compounds are irradiated with ultraviolet rays in the presence of the ultraviolet absorber or light stabilizer, thereby adversely affecting durability of the liquid crystal layer itself.

SUMMARY

The present application relates to a polarizing plate. It is one object of the present application to provide a polarizing plate comprising a retardation layer exhibiting ultraviolet blocking characteristics even in a state where the retardation layer does not include any ultraviolet absorber or light stabilizer.

In addition, it is another object of the present application to provide a polarizing plate which can be used alone or in combination with an appropriate sunscreen or a light stabilizer as needed to selectively block ultraviolet rays in a region requiring blocking, without affecting display performance, such as color senses and image quality, of a display device. The polarizing plate can also be formed thinly without requiring a separate ultraviolet blocking layer, and also has excellent durability, because the polarizing plate exhibits a certain ultraviolet blocking property even in the absence of an ultraviolet absorber or light stabilizer.

An exemplary polarizing plate of the present application may comprise a polarizer and at least two retardation layers, wherein at least one or both of the retardation layers may exhibit ultraviolet blocking characteristics even in a state where any ultraviolet absorber or light stabilizer is not blended.

An embodiment of the present application provides a polarizing plate comprising a polarizer; a first retardation layer which is positioned on the bottom of the polarizer, comprises a polymerized unit of a normal wavelength dispersion polymerizable liquid crystal compound and a polymerized unit of a reverse wavelength dispersion polymerizable liquid crystal compound, and has transmittance of 3% or less with respect to light having wavelength of 385 nm; and a second retardation layer positioned on the bottom of the first retardation layer.

BRIEF DESCRIPTION OF DRAWINGS

FIGS. 1 and 2 are schematic illustrations of exemplary polarizing plates of the present application.

FIG. 3 is a schematic illustration to explain a slow axis, a fast axis and a thickness direction of a retardation layer.

FIGS. 4 and 5 are schematic illustrations of exemplary polarizing plates of the present application.

FIGS. 6 to 9 are graphical representations of the ultraviolet absorption characteristics of Examples 1 and 2 and Comparative Examples 1 and 2, respectively.

FIGS. 10 to 13 are graphical representations of the retardation changes of Examples 1 and 2 and Comparative Examples 1 and 2, respectively.

DETAILED DESCRIPTION

Hereinafter, in this specification, for convenience of description, any one of the two retardation layers may be referred to as a first retardation layer and the other may be referred to as a second retardation layer, but the first and second expressions do not indicate the order, position and relative merit between the retardation layers, which are used for simple distinction.

In the polarizing plate of the present application, the polarizer and/or the retardation layer is designed to have controlled optical properties for light in the ultraviolet region, particularly, any wavelength or wavelengths within a certain range of light in the ultraviolet region, i.e., having a wavelength of 380 nm or more. In the present application, the polarizer and/or the retardation layer is designed such that it can selectively block the ultraviolet region of specific wavelengths without including an additive such as an ultraviolet absorber or a light stabilizer, whereby it is possible to provide a polarizing plate conforming to the object of the present application.

The polarizing plate of the present application can achieve stability and durability by itself, while selectively and effectively blocking ultraviolet rays affecting durability of the device, and can also be applied to a display device to maintain excellent display quality.

In this specification, the term polarizer means a film, sheet or element having a polarization function. The polarizer is a functional element capable of extracting light that vibrates in one direction from incident light that vibrates in various directions.

An absorptive linear polarizer can be used as the polarizer. As such a polarizer, a PVA (poly(vinyl alcohol)) polarizer is known. Basically, in the present application, a known polarizer can be used as the polarizer.

In one example, a polarizer having the following characteristics may be selected and used from known PVA (poly(vinyl alcohol)) polarizers.

The polarizer applied in the present application may have single transmittance (Ts) of 20% or more or 60% or less for light having a wavelength of 390 nm. In another example, the single transmittance of the polarizer for light having a wavelength of 390 nm may be 59% or less, 58% or less, 57% or less, 56% or less, 55% or less, 54% or less, 53% or less, 52% or less, 51% or less, 50% or less, 49% or less, 48% or less, 47% or less, 46% or less, 45% or less, 44% or less, 43% or less, 42% or less, 41% or less, or 40% or less, or may be 21% or more, 22% or more, 23% or more, 24% or more, or 25% or more.

The single transmittance of the polarizer can be measured using, for example, a spectrometer (V7100, manufactured by Jasco). For example, the single transmittance can be calculated after the air is set to the base line in a state where the polarizer sample (not including the upper and lower protective films) is placed on the apparatus and each transmittance is measured in a state in which the axis of the polarizer sample is vertically and horizontally aligned with the axis of the reference polarizer.

The polarizing plate can be imparted with an appropriate ultraviolet blocking property and maintain durability and stability by combining the polarizer having a single transmittance for light having a wavelength of 390 nm in the above range with a retardation layer to be described below.

In general, the PVA (poly(vinyl alcohol))-based linear absorptive polarizer exhibits the above single transmittance, and in the present application, such a PVA-based linear absorptive polarizer can be applied, but the kind of the polarizer that can be applied is not limited to the above, as long as it exhibits the above single transmittance.

The PVA polarizer generally comprises a PVA film or sheet and an anisotropic absorbent material, such as a dichroic dye or iodine, adsorbed and oriented on the PVA film or sheet.

The PVA film or sheet can be obtained, for example, by gelling PVAc (poly(vinyl acetate)). The PVAc (poly(vinyl acetate)) can be exemplified by a homopolymer of vinyl acetate; and a copolymer of vinyl acetate and other monomers, and the like. Here, the other monomers copolymerized with vinyl acetate can be exemplified by one or two or more of an unsaturated carboxylic acid compound, an olefinic compound, a vinyl ether compound, an unsaturated sulfonic acid compound and an acrylamide compound having an ammonium group, and the like.

The polyvinyl acetate generally has a gelation degree of about 85 mol % to about 100 mol % or 98 mol % to 100 mol % or so. The polyvinyl alcohol in the linear polarizer may generally have a polymerization degree of about 1,000 to about 10,000 or about 1,500 to about 5,000.

The PVA polarizer is produced via a dying process and a stretching process on the PVA film or sheet. If necessary, the production process of the polarizer may further comprise a swelling, crosslinking, cleaning and/or drying process.

Here, for example, the dyeing process is a process for adsorbing iodine, which is an anisotropic absorbent material, on a PVA film or sheet, and may be performed by immersing the PVA film or sheet in a treatment tank containing iodine and potassium iodide, the single transmittance can be controlled by a controlling the concentration of iodine and potassium iodide in the treatment tank.

In the dyeing process, the PVA film or sheet is immersed in a dyeing solution or a crosslinking solution containing an iodide such as iodine ($I_2$) or KI and/or a boric acid compound (boric acid or a borate) or the like, where in this procedure, the anisotropic absorbent material such as iodine is adsorbed on the PVA film or sheet. Accordingly, in the procedure, the kind or amount of the anisotropic absorbent material adsorbed on the polarizer is determined by the concentration of the compound in the dyeing solution, whereby the absorption rate and transmittance of the polarizer for light having a specific wavelength can be determined. For example, a species of the iodine compound that may be present in the dyeing solution may be $I^-$, $I_2$, $I_3^-$ or $I_5^-$, and the like derived from an iodide ($M^+I^-$) and iodine ($I_2$). Among these compounds, $I^-$ has an absorption wavelength range of about 190 nm to 260 nm and its effect on the color sense is not significant, $I_2$ has an absorption wavelength range of about 400 nm to 500 nm and its color sense is mainly red, $I_3^-$ has an absorption wavelength range of about 250 nm to 400 nm and its color sense is mainly yellow, $I_5^-$ of the linear structure has no observed absorption wavelength range and its effect on the color sense is not significant, and $I_5^-$ of the curved structure has an absorption wavelength range of about 500 nm to 900 nm and its color sense is mainly blue. Therefore, by controlling the species ratio of the iodine compound formed in the dyeing solution, it is possible to control the single transmittance for light having a wavelength of 390 nm.

The dyeing solution is generally an iodine solution which is an aqueous solution in which iodine ions are formed through iodine, and an iodide as a solubilizing aid, and a boric acid compound is also added to the aqueous solution for the crosslinking process, where the species and ratio of the iodine compound formed in the relevant dyeing solution can be determined depending on the concentration of the iodine and iodide added to the aqueous solution. As the iodine compound, for example, potassium iodide, lithium iodide, sodium iodide, zinc iodide, aluminum iodide, lead iodide, copper iodide, barium iodide, calcium iodide, tin iodide or titanium iodide, and the like can be used.

In order to produce a polarizer that satisfies the transmittance for light having a wavelength of 390 nm, which is a condition of the present application, the concentration of the iodide in the dyeing solution used in the dyeing process is about 1.5 weight % or more and the concentration of the iodine ($I_2$) is 0.05 to 20 weight % or so. In another example, the concentration of the iodide may be about 20 weight % or less, 18 weight % or less, 16 weight % or less, 14 weight % or less, 12 weight % or less, 10 weight % or less, 8 weight % or less, or about 7 weight % or less. Also, in another example, the concentration of the iodine may be 19 weight % or less, 18 weight % or less, 17 weight % or less, 16 weight % or less, 15 weight % or less, 14 weight % or less, 13 weight % or less, 12 weight % or less, 11 weight % or less, 10 weight % or less, 9 weight % or less, 8 weight % or less, 7 weight % or less, 6 weight % or less, 5 weight % or less, 4 weight % or less, 3 weight % or less, 2 weight % or less, or 1 weight % or less or so.

If the concentration of the iodide and/or iodine in the dyeing solution is adjusted to the above range, the species and concentration of the iodine compound in the dyeing solution can be formed so that the single transmittance for light having a wavelength of 390 nm can fall within the above-mentioned range.

For the production of the polarizer of the present application, the concentration of the dyeing liquid applied in the dyeing process can be adjusted as described above, and other processes can be performed according to generally known methods. In addition, the dyeing process can also be performed according to a known method, except that the concentration of the dyeing solution is controlled as described above.

For example, in the dyeing process, a PVA film or sheet can be immersed in the dyeing solution controlled as above. In the dyeing process, the temperature of the dyeing solution is usually about 20° C. to 50° C. or 25° C. to 40° C. or so, and the immersing time is usually 10 seconds to 300 seconds or 20 seconds to 240 seconds or the like, but is not limited thereto.

In the production procedure of the polarizer, a crosslinking process may also be performed. The crosslinking process can be performed using, for example, a crosslinking agent such as a boron compound. The order of such a crosslinking process is not particularly limited, and it can be performed, for example, together with a dyeing and/or stretching process, or proceed separately. For example, when a crosslinking agent is additionally combined in the above-mentioned dyeing solution, the crosslinking process may proceed simultaneously with dyeing. Such a crosslinking process may also be performed multiple times. As the boron compound, boric acid or borax, and the like may be used. The boron compound can be generally used in the form of an aqueous solution or a mixed solution of water and an organic solvent, and usually an aqueous solution of boric acid is used. The boric acid concentration in the boric acid aqueous solution can be selected in an appropriate range based on the degree of crosslinking and the heat resistance thereof, and the like. An iodine compound such as potassium iodide can also be contained in a boric acid aqueous solution or the like.

The crosslinking process can be performed by immersing the PVA film or sheet in a boric acid aqueous solution or the like, where in this procedure, the treatment temperature is usually in a range of 25° C. or higher, 30° C. to 85° C. or 30° C. to 60° C. or so, and the treatment time is usually 5 seconds to 800 seconds or 8 seconds to 500 seconds or so, but is not limited thereto.

The stretching process is generally performed by uniaxial stretching. Such stretching may be performed together with the dyeing and/or crosslinking process. The stretching method is not particularly limited, and for example, a wet stretching method can be applied. In such a wet stretching method, for example, it is common to perform stretching after dyeing, but stretching may be performed together with crosslinking, which may also be performed multiple times or in multiple stages.

An iodine compound such as potassium iodide may be included in the treatment liquid applied to the wet stretching method. In stretching, the treatment temperature is usually in a range of 25° C. or higher, 30° C. to 85° C. or 50° C. to 70° C., and the treatment time is usually 10 seconds to 800 seconds or 30 seconds to 500 seconds, but is not limited thereto.

The total draw ratio during the stretching procedure can be adjusted in consideration of orientation characteristics and the like, and the total draw ratio may be 3 to 10 times, 4 to 8 times, or 5 to 7 times, based on the original length of the PVA film or sheet, but is not limited thereto. Here, the total draw ratio may mean a cumulative draw ratio including the stretching in each process in the case of involving the stretching even in the swelling process or the like other than the stretching process. Such a total draw ratio can be adjusted in consideration of the orientation property, workability, or stretch cutting possibility, and the like.

In addition to the dyeing, crosslinking and stretching, the swelling process may also be performed before the other processes are performed. It is possible to clean contamination or a blocking inhibitor of the PVA film or sheet surface by the swelling, whereby it is possible to reduce unevenness such as a dyeing deviation.

In the swelling process, water, distilled water or pure water, and the like can be usually used. The main component of the concerned treatment liquid is water, and if necessary, it may contain a small amount of an additive such as an iodine compound such as potassium iodide or a surfactant, or an alcohol, and the like. In this procedure, it is also possible to adjust the above-described light blocking rate by controlling process variables.

The treatment temperature in the swelling process is usually about 20° C. to 45° C. or 20° C. to 40° C. or the like, but is not limited thereto. Since the swelling deviations can cause the dyeing deviation, the process variables can be adjusted so that the occurrence of such swelling deviations is suppressed as much as possible.

Proper stretching can also be performed in the swelling process. The draw ratio may be 6.5 times or less, 1.2 to 6.5 times, 2 times to 4 times, or 2 times to 3 times or the like, based on the original length of the PVA film. The stretching in the swelling procedure can control the stretching in the stretching process performed after the swelling process to be small and control it so that the stretching breakage of the film does not occur.

In the production procedure of the polarizer, metal ion treatment can be performed. This treatment is performed, for example, by immersing the PVA film in an aqueous solution containing a metal salt. This allows the metal ions to be contained in the polarizer, where in this procedure, the color tone of the PVA polarizer can also be controlled by adjusting the kind or ratio of metal ions. The applicable metal ions can be exemplified by metal ions of a transition metal such as cobalt, nickel, zinc, chromium, aluminum, copper, manganese or iron, and the adjustment of the color tone may also be possible by selecting an appropriate type of these.

After the dyeing, crosslinking and stretching, the cleaning process may proceed. Such a cleaning process can be performed with an iodine compound solution such as potassium iodide.

Such cleaning with water and cleaning with the iodine compound solution may be combined, where a solution in which a liquid alcohol such as methanol, ethanol, isopropyl alcohol, butanol or propanol is combined may also be used.

After passing through such a process, the polarizer can be produced by performing a drying process. The drying process, for example, may be performed at an appropriate temperature for an appropriate time in consideration of the required moisture content and the like, and such conditions are not particularly limited.

The polarizer produced in such a manner may comprise a PVA film or sheet and an anisotropic absorbent material which is adsorbed and oriented on the PVA film or sheet. Here, the anisotropic absorbent material may be iodine, and in the present application, such a polarizer may be referred to as an iodine-based PVA polarizer.

Although the above description has been made with respect to the iodine-based PVA polarizer among the known polarizers applicable to the present application, the kind of the polarizers applicable in the present application is not limited to the above, and as long as the single transmittance for light having a wavelength of 390 nm falls within the above-described range, any kind of polarizer, among the various known polarizers, may also be applied in the present application.

In addition, the thickness of the polarizer is not particularly limited, and a thickness range of known polarizers may be applied in the present application.

In the polarizing plate of the present application, a first retardation layer is disposed on the bottom of the polarizer. In this specification, the term bottom means a direction from the polarizer toward the first retardation layer.

FIG. 1 is a schematic illustration of a polarizing plate including the polarizer (100), the first retardation layer (200) formed on the bottom of the polarizer (100), and the second retardation layer (300) formed on the bottom of the first retardation layer (200). As illustrated in FIG. 2, the positions of the first and second retardation layers may be changed, whereby the second retardation layer (300) may be present on the bottom of the polarizer (100), and the first retardation layer (200) may be formed on the bottom of the second retardation layer (300).

The first retardation layer has a blocking ability or an absorbing ability against ultraviolet rays in a predetermined wavelength range in itself. For example, the first retardation layer may have transmittance for light having wavelengths of 385 nm, 390 nm, 395 nm, and/or 400 nm in a predetermined range.

For example, the first retardation layer may have a transmittance of 3% or less for light having a wavelength of 385 nm. In another example, the transmittance may be 2.9% or less, 2.8% or less, 2.7% or less, 2.6% or less, 2.5% or less, 2.4% or less, 2.3% or less, 2.2% or less, 2.1% or less, 2.0% or less, 1.9% or less, 1.8% or less, 1.7% or less, 1.6% or less, 1.5% or less, or 1.4% or less. In another example, the transmittance may be 0% or more, 0.1% or more, 0.2% or more, 0.3% or more, 0.4% or more, 0.5% or more, 0.6% or more, 0.7% or more, 0.8% or more, 0.9% or more, 1.0% or more, 1.1% or more, 1.2% or more, 1.3% or more, 1.4% or more, 1.5% or more, 1.6% or more, or 1.65% or more.

For example, the first retardation layer may have a transmittance of 15% or less for light having a wavelength of 390 nm. In another example, the transmittance may be 14% or less, 13% or less, 12% or less, 11% or less, 10% or less, 9% or less, 8% or less, 7% or less, 6% or less, 5% or less, 4% or less, or 3.5% or less. In another example, the transmittance may be 0% or more, 0.1% or more, 0.2% or more, 0.3% or more, 0.4% or more, 0.5% or more, 0.6% or more, 0.7% or more, 0.8% or more, 0.9% or more, 1% or more, 1.5% or more, 2% or more, 2.5% or more, 2.6% or more, 2.7% or more, 2.8% or more, 2.9% or more, 3.1% or more, 3.2% or more, 3.3% or more, 3.4% or more, 3.5% or more, or 3.6% or more.

For example, the first retardation layer may have a transmittance of 25% or less for light having a wavelength of 395 nm. In another example, the transmittance may be 24% or less, 23% or less, 22% or less, 21% or less, 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, or 3.5% or less. In another example, the transmittance may be 0% or more, 0.1% or more, 0.2% or more, 0.3% or more, 0.4% or more, 0.5% or more, 0.6% or more, 0.7% or more, 0.8% or more, 0.9% or more, 1% or more, 1.5% or more, 2% or more, 2.5% or more, 3% or more, 3.5% or more, 4% or more, 4.5% or more, 5% or more, 5.5% or more, 6% or more, 6.5% or more, 7% or more, 7.5% or more, 8% or more, 8.5% or more, 9% or more, or 9.5% or more.

For example, the first retardation layer may have a transmittance of 40% or less for light having a wavelength of 400 nm. In another example, the transmittance may be 39.5% or less, 39% or less, 38.5% or less, 38% or less, 37.5% or less, 37% or less, 36.5% or less, 36% or less, 35.5% or less, 35% or less, 34.5% or less, 34% or less, 33.5% or less, 33% or less, 32.5% or less, 32% or less, 31.5% or less, 31% or less, 30% or less, 29.5% or less, 29% or less, 28.5% or less, 28% or less, 27.5% or less, or 27% or less or so. The transmittance may be 0% or more, 0.1% or more, 0.2% or more, 0.3% or more, 0.4% or more, 0.5% or more, 0.6% or more, 0.7% or more, 0.8% or more, 0.9% or more, 1% or more, 1.5% or more, 2% or more, 2.5% or more, 3% or more, 3.5% or more, 4% or more, 4.5% or more, 5% or more, 5.5% or more, 6% or more, 6.5% or more, 7% or more, 7.5% or more, 8% or more, 8.5% or more, 9% or more, 9.5% or more, 10% or more, 10.5% or more, 11% or more, 11.5% or more, 12% or more, 12.5% or more, 13% or more, 13.5% or more, 14% or more, 14.5% or more, 15% or more, 15.5% or more, 16% or more, 16.5% or more, 17% or more, 17.5% or more, 18% or more, 18.5% or more, 19% or more, 19.5% or more, 20% or more, 20.5% or more, 21% or more, 21.5% or more, 22% or more, 22.5% or more, 23% or more, 23.5% or more, 24% or more, 24.5% or more, or 25% or more or so.

The transmittance of the first retardation layer can be measured using a spectrometer (N&K analyzer, N&K Technologies, INC). The transmittance of the retardation layer can be measured after the relevant retardation layer is positioned on a film which substantially exhibits no absorption peak at wavelengths of 380 nm or more, where a liquid crystal alignment film or the like may also be present between the film and the retardation layer, or may not be present. Here, the fact that the retardation layer substantially exhibits no absorption peak at wavelengths of 380 nm or more may mean that the transmittance of light having wavelengths of, for example, 385 nm, 390 nm and 400 nm is 90% or more, respectively. In another example, the transmittance may be approximately 90% to 95% or so. Such a film includes, for example, an NRT (no retardation TAC (triacetyl cellulose)), Fuji) film or a TAC (triacetyl cellulose) film, and the like, but is not limited thereto.

For example, after placing the retardation layer on such a film and then setting air as the baseline, the transmittance can be calculated following measurement of transmittance in a state of being vertically and horizontally aligned with the slow axis which is the reference axis of the retardation layer.

The first retardation layer having the transmittance characteristics designed as above can ensure that the polarizing plate has stability and durability while exhibiting a blocking property for light having a wavelength in the range of 380 to 400 nm.

This effect can be further improved in combination with the above-mentioned polarizer. That is, when the single transmittance of the polarizer and/or the transmittance of the retardation layer do not satisfy the above-mentioned range, the ultraviolet blocking ability of the polarizing plate, particularly the blocking ratio to light in the range of 380 to 400 nm is lowered or the ultraviolet blocking ability is excessively given to any one of the polarizer and the first retardation layer, so that the durability of the polarizing plate may be deteriorated.

In the present application, the ultraviolet blocking ability of the first retardation layer as above can also be realized without introducing an ultraviolet absorber or a light stabilizer, and the like into the first retardation layer separately. Therefore, in one example, the first retardation layer may not include an ultraviolet absorber or a light stabilizer, for example, an ultraviolet absorber or a light stabilizer, having a maximum absorption wavelength in the range of 385 nm to 400 nm. That is, when the first retardation layer is constituted by suitably combining a normal wavelength dispersion polymerizable liquid crystal compound and a reverse wavelength dispersion polymerizable liquid crystal compound as described below, the structural characteristics of the individual polymerizable liquid crystal compounds are complementary to each other, whereby the desired ultraviolet absorptivity can be ensured without applying an ultraviolet absorber or a light stabilizer and the like. By excluding an ultraviolet absorber and a light stabilizer in this way, it is possible to form a first retardation layer having excellent durability that does not cause poor orientation of liquid crystals by the addition of additives or a bleeding-out phenomenon after formation of the first retardation layer, and the like.

In one example, the first retardation layer having the ultraviolet blocking ability can be realized by designing a reverse wavelength dispersion characteristic in the same manner as described below.

The first retardation layer may be a layer having a refractive index relationship according to any one of the following Equations 1 to 3:

$$nx>ny=nz; \qquad \text{[Equation 1]}$$

$$nx>ny>nz; \qquad \text{[Equation 2]}$$

$$nx>ny \text{ and } nz>ny. \qquad \text{[Equation 3]}$$

In Equations 1 to 3, nx, ny and nz are the refractive index in the x-axis direction (slow axis direction), the refractive index in the y-axis direction (fast axis direction) and the refractive index in the z-axis direction (thickness direction), respectively, and such definitions may be equally applied in this specification, unless otherwise specified. Here, as illustrated in FIG. 3, the x-axis direction may mean, for example, a slow axis direction on the surface of the first retardation layer (200) in the form of a film or sheet, the y-axis direction may mean a planar direction (fast axis direction) perpendicular to the x-axis, and the z-axis direction may mean a normal direction, for example, a thickness direction of the plane formed by the x-axis and the y-axis.

Unless otherwise specified, the refractive index or retardation herein is the refractive index or retardation for light having a wavelength of about 550 nm.

The first retardation layer may have, for example, an in-plane retardation within a range capable of having a quarter-wave phase delay characteristic. The term n-wave phase delay characteristic means a characteristic that the incident light can be phase-delayed by n times the wavelength of the incident light within at least a part of the wavelength range. The quarter-wave phase delay characteristic may be a characteristic that the incident linearly polarized light is converted into elliptically polarized light or circularly polarized light and conversely, the incident elliptically polarized light or circularly polarized light is converted into linearly polarized light. In one example, the first retardation layer may have an in-plane retardation for light having wavelength of 550 nm in a range of 90 nm to 300 nm. In another example, the in-plane retardation may be 100 nm or more, 105 nm or more, 110 nm or more, 115 nm or more, 120 nm or more, 125 nm or more, or 130 nm or more. In addition, the in-plane retardation may be 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm or less, 170 nm or less, 160 nm or less, 150 nm or less, or 145 nm or less.

In this specification, the term in-plane retardation is a value determined according to Equation 4 below, and the thickness direction retardation is a value determined according to Equation 5 below:

$$Rin=d\times(nx-ny); \qquad \text{[Equation 4]}$$

$$Rth=d\times(nz-ny). \qquad \text{[Equation 5]}$$

In Equations 4 and 5, Rin is an in-plane retardation, Rth is a thickness direction retardation, nx, ny, and nz are as defined in Equations 1 to 3 above, and d is the thickness of the first retardation layer.

For the first retardation layer, the range of the thickness direction retardation obtained according to Equation 5 above is not particularly limited, which may be, for example, in a range of about −200 nm to 200 nm. In another example, the thickness direction retardation may be −190 nm or more, −180 nm or more, −170 nm or more, −160 nm or more, −150 nm or more, −140 nm or more, −130 nm or more, −120 nm or more, −110 nm or more, −100 nm or more, −90 nm or more, −80 nm or more, −70 nm or more, −60 nm or more, −50 nm or more, −40 nm or more, −30 nm or more, −20 nm or more, or −10 nm or more. Also, in another example, the thickness direction retardation may be 190 nm or less, 180 nm or less, 170 nm or less, 160 nm or less, 150 nm or less, 140 nm or less, 130 nm or less, 120 nm or less, 110 nm or less, 100 nm or less, 90 nm or less, 80 nm or less, 70 nm or less, 60 nm or less, 50 nm or less, 40 nm or less, 30 nm or less, 20 nm or less, or 10 nm or less.

In one example, the first retardation layer may be a layer that satisfies Equation 6 below:

$$R(450)/R(550)<R(650)/R(550). \qquad \text{[Equation 6]}$$

In Equation 6, R (450) is the in-plane retardation of the first retardation layer for light having a wavelength of 450 nm, R (550) is the in-plane retardation of the first retardation layer for light having a wavelength of 550 nm, and R (650) is the in-plane retardation of the first retardation layer for light having a wavelength of 650 nm.

The in-plane retardation is each obtained according to Equation 4 above. However, the values of nx and ny used in Equation 4 to calculate the in-plane retardation for light having a wavelength of 450 nm are the respective refractive indexes for light having a wavelength of 450 nm; as the values of nx and ny used in Equation 4 to calculate the in-plane retardation for light having a wavelength of 550 nm are the respective refractive indexes for light having a wavelength of 550 nm; and as the values of nx and ny used in Equation 4 to calculate the in-plane retardation for light having a wavelength of 650 nm are the respective refractive indexes for light having a wavelength of 650 nm.

The first retardation layer satisfying Equation 6 is a first retardation layer having a so-called reverse wavelength dispersion characteristic. Such a first retardation layer can exhibit a phase delay characteristic designed in a wide wavelength range.

It is possible to provide a polarizing plate with better effects by controlling R (450)/R (550) and/or R (650)/R (550) in the first retardation layer satisfying Equation 6. In one example, R (450)/R (550) in Equation 6 above may be in a range of 0.6 to 0.99. In another example, R (450)/R (550) may be 0.61 or more, 0.62 or more, 0.63 or more, 0.64 or more, 0.65 or more, 0.66 or more, 0.67 or more, 0.69 or more, 0.70 or more, 0.71 or more, 0.72 or more, 0.73 or more, 0.74 or more, 0.75 or more, 0.76 or more, 0.77 or more, 0.78 or more, 0.79 or more, 0.80 or more, 0.81 or more, 0.82 or more, 0.83 or more, 0.84 or more, 0.85 or more, 0.86 or more, 0.87 or more, 0.88 or more, 0.89 or more, or 0.90 or more. In another example, the R (450)/R (550) may be 0.98 or less, 0.97 or less, 0.96 or less, 0.95 or less, 0.94 or less, 0.93 or less, 0.92 or less, 0.91 or less, 0.90 or less, 0.89 or less, 0.88 or less, 0.87 or less, 0.86 or less, or 0.85 or less. R (650)/R (550) in Equation 6 may be in a range of 1.00 to 1.19. The R (650)/R (550) may be 1.18 or less, 1.17 or less, 1.16 or less, 1.15 or less, 1.14 or less, 1.13 or less, 1.12 or less, 1.11 or less, 1.1 or less, or 1.08 or less or so. In another example, R (650)/R (550) in Equation 6 may be 1.01 or more, 1.02 or more, 1.03 or more, 1.04 or more, 1.05 or more, 1.06 or more, 1.07 or more, 1.08 or more, or 1.09 or more.

The method of adjusting R (450)/R (550) and/or R (650)/R (550) of the first retardation layer to the above range is not particularly limited, but in the present application, it can be realized by using two polymerizable liquid crystal compounds having different reverse wavelength dispersion characteristics as above, as described below, to achieve the desired ultraviolet blocking ability even if the ultraviolet absorber or light stabilizer is not included in the retardation layer.

The first retardation layer may be laminated on one side of the polarizer so that its slow axis and the absorption axis of the polarizer may form an angle within a range of about 30 degrees to 60 degrees. In another example, the angle may be 35 degrees or more, or 40 degrees or more, and may also be 55 degrees or less, or 50 degrees or less.

As the first retardation layer, a known material can be used without particular limitation, as long as it has the transmittance characteristic and in-plane retardation.

For example, a stretched polymer layer or liquid crystal layer obtained by stretching a polymer film capable of imparting optical anisotropy by stretching in a suitable manner can be used. As the liquid crystal layer, a liquid crystal polymer layer or a cured layer of a polymerizable liquid crystal compound can be used.

As the stretched polymer layer, for example, a polymer layer can be used, which comprises polyolefin such as polyethylene or polypropylene, a cyclic olefin polymer (COP) such as polynorbornene, polyvinyl chloride, polyacrylonitrile, polysulfone, an acrylic resin, polycarbonate, polyester such as polyethylene terephthalate, polyacrylate, polyvinyl alcohol, a cellulose ester-based polymer such as TAC (triacetyl cellulose), or a copolymer of two or more monomers among the monomers forming the polymer, and the like.

As the first retardation layer, various known materials can be used, but generally known first retardation layers often do not satisfy the above-mentioned characteristics, in particular, the transmittance characteristics for light having a wavelength of 385 nm, 390 nm, 395 nm, or 400 nm.

Therefore, for example, when the stretched polymer layer is intended to be applied as a first retardation layer, a process of adding an additive having an appropriate absorption property for the above-mentioned wavelength upon producing the polymer layer may be required.

It is advantageous to apply a liquid crystal polymer layer or a cured layer of a polymerizable liquid crystal composition as a first retardation layer in order to achieve the desired transmittance characteristic in the above-mentioned wavelength range, and particularly, it is advantageous to apply a cured layer of a polymerizable liquid crystal composition comprising a polymerizable liquid crystal compound having a specific reverse wavelength dispersion characteristic to be described below.

The first retardation layer may comprise at least a polymerized unit of a normal wavelength dispersion polymerizable liquid crystal compound to be described below and a polymerization unit of a reverse wavelength dispersion polymerizable liquid crystal compound to be also described below. Here, the polymerized unit means a unit formed by polymerizing or curing the respective polymerizable liquid crystal compounds, as described below.

For example, in the present application, a first retardation layer can be manufactured by mixing two or more polymerizable liquid crystal compounds so as to satisfy the properties of Equation 6 above, and for example, a polymerizable liquid crystal compound having a low value of R (450)/R (550) (for example, a reverse wavelength dispersion polymerizable liquid crystal compound as described below) and a polymerizable liquid crystal compound having a high value of R (450)/R (550) (for example, a normal wavelength dispersion polymerizable liquid crystal compound as described below) can be combined to satisfy the properties of Equation 6 above.

In this specification, the term "polymerizable liquid crystal compound" may mean a compound containing a moiety capable of exhibiting liquid crystallinity, such as a mesogen skeleton, and also containing one or more polymerizable functional groups. Such polymerizable liquid crystal compounds are variously known under the so-called RM (reactive mesogen). The polymerizable liquid crystal compound may be contained in the polymerized form in the cured layer, that is, the above-described polymerized unit, which may mean a state where the liquid crystal compound is polymerized to form skeletons of the liquid crystal polymer such as main chains or side chains in the cured layer.

The polymerizable liquid crystal compound may be a monofunctional or multifunctional polymerizable liquid crystal compound. Here, the monofunctional polymerizable liquid crystal compound may be a compound having one polymerizable functional group and the multifunctional polymerizable liquid crystal compound may mean a compound containing two or more polymerizable functional groups. In one example, the polyfunctional polymerizable liquid crystal compound may comprise 2 to 10, 2 to 8, 2 to 6, 2 to 5, 2 to 4, 2 to 3, or 2 or 3 polymerizable functional groups.

It is known that a polymerizable liquid crystal composition prepared by combining the polymerizable liquid crystal compound with other components such as an initiator, a stabilizer and/or a non-polymerizable liquid crystal compound is cured in a state where it is oriented on an alignment film to form the cured layer expressed with birefringence, and in the present application, the above-mentioned transmittance characteristics can be achieved by controlling the properties of the polymerizable liquid crystal compound used in such a known process.

In one example, in order to achieve the above-described transmittance characteristics, it is advantageous that the cured layer of the polymerizable liquid crystal composition comprising the reverse wavelength dispersion polymerizable liquid crystal compound is applied. Here, the reverse wavelength dispersion polymerizable liquid crystal compound means a polymerizable liquid crystal compound in which the liquid crystal layer (cured layer) formed by curing the polymerizable liquid crystal compound alone exhibits reverse wavelength dispersion characteristics, where the reverse wavelength dispersion characteristics mean the properties described Equation 6 above.

In the present application, among the reverse wavelength dispersion polymerizable liquid crystal compounds, particularly, a liquid crystal compound having R (450)/R (550) of Equation 6 in a range of 0.6 to 0.99 can be applied. In another example, R (450)/R (550) of the reverse wavelength dispersion polymerizable liquid crystal compound may be 0.61 or more, 0.62 or more, 0.63 or more, 0.64 or more, 0.65 or more, 0.66 or more, 0.67 or more, 0.69 or more, 0.70 or more, 0.71 or more, 0.72 or more, 0.73 or more, 0.74 or more, 0.75 or more, 0.76 or more, 0.77 or more, 0.78 or more, 0.79 or more, 0.80 or more, 0.81 or more, 0.82 or more, 0.83 or more, 0.84 or more, 0.85 or more, 0.86 or more, 0.87 or more, 0.88 or more, 0.89 or more, or 0.90 or more. In another example, the R (450)/R (550) may be 0.98 or less, 0.97 or less, 0.96 or less, 0.95 or less, 0.94 or less, 0.93 or less, 0.92 or less, 0.91 or less, 0.90 or less, 0.89 or less, 0.88 or less, 0.87 or less, 0.86 or less, or 0.85 or less. Also, the reverse wavelength dispersion polymerizable liquid crystal compound may have R (650)/R (550) of Equation 6 in a range of 1.00 to 1.19. The R (650)/R (550) may be 1.18 or less, 1.17 or less, 1.16 or less, 1.15 or less, 1.14 or less, 1.13 or less, 1.12 or less, 1.11 or less, 1.1 or less, or 0.08 or less or so. In another example, the R (650)/R (550) may be 1.01 or more, 1.02 or more, 1.03 or more, 1.04 or more, 1.05 or more, 1.06 or more, 1.07 or more, 1.08 or more, or 1.09 or more or so. Among various known polymerizable liquid crystal compounds, particularly, in the case of the polymerizable liquid crystal compounds that the value of R (450)/R (550) is in the above-mentioned range, the present inventors have confirmed that the above-described transmittance characteristics are effectively satisfied by red shift of the UV absorption wavelength region, when it is combined with the normal wavelength dispersion polymerizable liquid crystal compound, as described below. In one example, the R (450)/R (550) may also be 0.6 or more, 0.61 or more, 0.62 or more, 0.63 or more, 0.64 or more, 0.65 or more, 0.66 or more, 0.67 or more, 0.68 or more, 0.69 or more, 0.70 or more, 0.71 or more, 0.72 or more, 0.73 or more, 0.74 or more, 0.75 or more, 0.76 or more, 0.77 or more, or 0.78 or more.

It is determined that this phenomenon is due to the inherent molecular structure of the reverse wavelength dispersion polymerizable liquid crystal compound designed to have R (450)/R (550) in the above range. That is, the birefringence of the polymerizable liquid crystal compound is known to be mainly determined by a molecular conjugation structure, differential oscillator strength and order parameters, and the like, and in order for the polymerizable liquid crystal compound to exhibit high birefringence, large electron density in the direction of the main axis is required, and thus most of the polymerizable liquid crystal compounds have a highly conjugated shape in the long axis direction.

However, in order for the polymerizable liquid crystal compound to exhibit the reverse wavelength dispersion property, it is necessary to adjust the birefringence between the long axis and the axis perpendicular thereto, and accordingly, the polymerizable liquid crystal compound designed to have the reverse wavelength dispersion property has mostly a molecular shape in the form of a T or an H and simultaneously is a shape that the main axis (long axis) has a large retardation and a small dispersion value, and the axis perpendicular thereto has a small retardation and a large dispersion value.

However, since the electronic transition ($\pi \rightarrow \pi^*$) absorbing light having wavelength from 180 nm to 400 nm within the ultraviolet region shifts to a longer wavelength as the conjugation length becomes longer, the polymerizable liquid crystal compound designed to have the reverse wavelength dispersion characteristic conjugates with the negative birefringent portion to cause a red shift phenomenon in which the ultraviolet absorption wavelength region is shifted to a longer wavelength.

The present inventors have confirmed that among the reverse wavelength dispersion polymerizable liquid crystal compounds having the above characteristics, particularly, the polymerizable liquid crystal compound designed so that the range of R (450)/R (550) is in the above-mentioned range exhibits the appropriate range of red shift capable of satisfying the transmittance characteristics required in the present application.

In particular, in the case of the reverse wavelength dispersion polymerizable liquid crystal compound having the following structure, the present inventors have confirmed that while the reverse dispersion polymerizable liquid crystal compound exhibits the desired ultraviolet blocking ability when it has been mixed with the normal wavelength dispersion polymerizable liquid crystal compound, its retardation properties (R (450)/R (550) and R (650)/R (550)) can also be effectively designed to achieve a desired purpose.

[Formula 1]

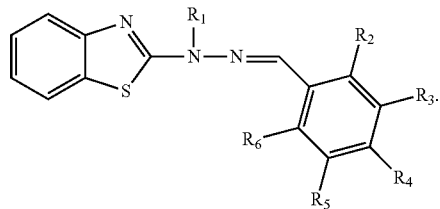

In Formula 1, $R_1$ is a substituent of the following Formula 2 or 3, and $R_2$ to $R_6$ are each independently hydrogen, an alkyl group, an alkoxy group, a cyano group, a substituent of the following formula 4 or a substituent of the following formula 5. In the above, at least two of $R_2$ to $R_6$ may be substituents of the following Formula 4 or substituents of the following Formula 5 or two of $R_2$ to $R_6$ may be substituents of the following Formula 4 or substituents of the following Formula 5.

For example, in Formula 1, any one of $R_2$ and $R_3$ and any one of $R_5$ and $R_6$ may be a substituent of the following Formula 4 or 5.

[Formula 2]

In Formula 2, $A_1$ and $A_2$ are each independently an oxygen atom or a single bond, $L_1$ and $L_2$ are each independently —C(=O)—O—, —O—C(=O)— or an alkylene group, Cyc is an arylene group or a cycloalkylene group, and P is a polymerizable functional group.

[Formula 3]

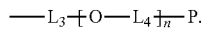

In Formula 3, $L_3$ and $L_4$ are each an alkylene group, n is a number in a range of 1 to 4, and P is a polymerizable functional group or a hydrogen atom.

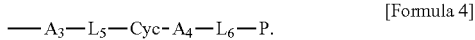

$$—A_3—L_5—Cyc-A_4—L_6—P. \quad \text{[Formula 4]}$$

In Formula 4, $A_3$ and $A_4$ are an oxygen atom, an alkylene group or a single bond, $L_5$ and $L_6$ are each independently —C(=O)—O—, —O—C(=O)— or an alkylene group, Cyc is an arylene group, and P is a polymerizable functional group.

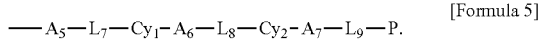

$$—A_5—L_7—Cy_1-A_6—L_8—Cy_2-A_7—L_9—P. \quad \text{[Formula 5]}$$

In Formula 5, $A_5$, $A_6$ and $A_7$ are each independently an oxygen atom or a single bond, $L_7$, $L_8$ and $L_9$ are each independently —C(=O)—O—, —O—C(=O)— or an alkylene group, Cy1 is a cycloalkylene group, Cy2 is an arylene group, and P is a polymerizable functional group.

In Formulas 1 to 5 above, the term single bond is a case where there is no separate atom at the corresponding site, for example, if $A_2$ in Formula 2 is a single bond, there is no separate atom in $A_2$ and a structure in which Cyc is directly connected to $L_2$ can be implemented.

In Formulas 1 to 5 above, the term alkyl group, alkoxy group or alkylene group may be a linear or branched alkyl group, alkoxy group or alkylene group, having 1 to 20 carbon atoms, 1 to 16 carbon atoms, 1 to 12 carbon atoms, 1 to 8 carbon atoms, or 1 to 4 carbon atoms, which may optionally be substituted by one or more substituents.

Also, in Formulas 1 to 5 above, the arylene group may be an arylene group having 6 to 12 carbon atoms or may be a phenylene group.

Furthermore, in Formulas 1 to 5 above, the cycloalkylene group may be a cycloalkylene group having 3 to 12 carbon atoms or 3 to 9 carbon atoms, or may be a cyclohexylene group.

In the substituents of Formula 2, $A_1$ may be a single bond, $L_1$ may be —C(=O)—O— or —O—C(=O)—, $A_2$ may be an oxygen atom, and $L_2$ may be an alkylene group having 3 or more, 4 or more, or 5 or more carbon atoms. The carbon number of the alkylene group in $L_2$ may be 12 or less, or 8 or less.

In one example of Formula 3 above, $L_3$ and $L_4$ may each independently be an alkylene group having 1 to 4 carbon atoms, n may be a number in a range of 1 to 3 or a number in a range of 1 to 2, or may be 2, and P may be a polymerizable functional group. Also, in this case, when the number of units of [O-$L_4$] in Formula 3 is 2 or more, the carbon number of the alkylene group of $L_4$ in each unit may be the same or different.

Also, in another example of Formula 3 above, $L_3$ and $L_4$ may each independently be an alkylene group having 1 to 4 carbon atoms, n may be a number in a range of 1 to 3 or a number in a range of 1 to 2, or may be 2, and P may be a hydrogen atom. Furthermore, in this case, when the number of units of [O-$L_4$] in Formula 3 is 2 or more, the carbon number of the alkylene group of $L_4$ in each unit may be the same or different.

In Formula 4, $A_3$ may be a single bond or may be an alkylene group having 1 to 4 carbon atoms, $L_5$ may be —C(=O)—O— or —O—C(=O)—, $A_4$ may be an oxygen atom, $L_6$ may be an alkylene group having 3 or more, 4 or more, or 5 or more carbon atoms. The carbon number of the alkylene group in $L_6$ may be 12 or less or 8 or less.

In Formula 5, $A_5$ may be an oxygen atom, $L_7$ may be an alkylene group having 1 to 4 carbon atoms, $A_6$ may be a single bond, $L_8$ may be —C(=O)—O— or —O—C(=O)—, $A_7$ may be an oxygen atom, and $L_9$ may be an alkylene group having 3 or more, 4 or more, or 5 or more carbon atoms. The carbon number of the alkylene group in $L_9$ may be 12 or less, or 8 or less.

The present inventors have confirmed that such a polymerizable liquid crystal compound can effectively satisfy the desired physical properties by a unique T type structure and a conjugated structure realized by centering on N—N bonds.

In the above formulas, the kind of the polymerizable functional group is not particularly limited, which may be, for example, an acryloyl group, a methacryloyl group, an acryloyloxy group or a methacryloyloxy group.

In one example, it may be advantageous that as the reverse wavelength dispersion polymerizable liquid crystal compound, a compound, wherein, in Formula 1 above, $R_1$ is a substituent of Formula 3 above, and at least two or more or two of $R_2$ to $R_6$ are substituents of Formula 5 above, is used.

If necessary, a liquid crystal compound of Formula 1 above where $R_1$ is a substituent of Formula 3 above and P is a polymerizable functional group, and a liquid crystal compound of Formula 1 where $R_1$ is a substituent of Formula 3 above and P is a hydrogen atom, can be mixed and used, and in this case, the mixing ratio is determined according to the desired reverse wavelength dispersion characteristics (R (450)/R (550) and/or R (650)/R (550)), which is not particularly limited.

The polymerized units of the reverse wavelength dispersion polymerizable liquid crystal compound may be contained in the cured layer (liquid crystal layer) in a ratio of 40 weight % or more based on the weight of the polymerized units of the entire polymerizable liquid crystal compound. In another example, the ratio may also be about 45 weight % or more, 50 weight % or more, 55 weight % or more, 60 weight % or more, 65 weight % or more, 70 weight % or more, 75 weight % or more, 80 weight % or more, 85 weight % or more, or 95 weight % or more. The first retardation layer (liquid crystal layer) may contain only polymerized units of the liquid crystal compound of the Formula 1 above as the polymerizable liquid crystal compound, but from the viewpoint of realizing desired physical properties, it is advantageous that the normal wavelength dispersion polymerizable liquid crystal compound to be described below is contained together with the polymerized units of the liquid crystal compound of the Formula 1 above. Accordingly, the ratio may be 100 weight % or less than 100 weight %.

The polymerizable liquid crystal composition and/or the cured layer (liquid crystal layer) may further comprise, in addition to the reverse wavelength dispersion polymerizable liquid crystal compound, a polymerizable liquid crystal compound in which in Equation 1, R (450)/R (550) is in a range of 1.04 to 1.25, 1.04 to 1.15 or 1.06 to 1.15 (hereinafter, normal dispersion polymerizable liquid crystal compound). The application of the reverse wavelength dispersion polymerizable liquid crystal compound having the above-mentioned R (450)/R (550) is advantageous in that the cured layer (liquid crystal layer) exhibits the desired transmittance characteristics, but it is disadvantageous that as the value of R (450)/R (550) is somewhat low, the cured layer (liquid crystal layer) exhibits a reverse wavelength dispersion characteristic as a whole. Therefore, in order to overcome this disadvantage, the polymerizable liquid crystal compound having the R (450)/R (550) value in the above range may be added in the polymerizable liquid crystal composition and/or the cured layer to control the overall optical properties. The normal wavelength dispersion liquid crystal compound may have R (650)/R (550) of Equation 6 in a range of about 0.8 to 0.99, about 0.85 to 0.99, about 0.9 to 0.99, or about 0.91 to 0.99.

Such normal wavelength dispersion polymerizable liquid crystal compounds are variously known, and for example, polymerizable liquid crystal compounds known in Korean Patent No. 1729819, Korean Patent No. 1640670, Korean Patent No. 1557202, Korean Patent No. 1472187, Korean Patent No. 1460862, Korean Patent No. 1191124, Korean Patent No. 1191125 and/or Korean Patent No. 1191129 and the like can be used.

As such a normal wavelength dispersion polymerizable liquid crystal compound, various known materials can be used, but in order to achieve the desired physical properties by complementing miscibility with the previously described reverse wavelength dispersion polymerizable liquid crystal compound or ultraviolet absorptivity of the reverse wavelength dispersion polymerizable liquid crystal compound, it may be advantageous to use a compound represented by the following Formula 6:

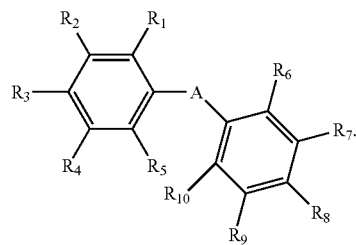

[Formula 6]

In Formula 6, A may be a single bond, —C(=O)O— or —OC(=O)— and $R_1$ to $R_{10}$ may each independently be hydrogen, halogen, an alkyl group, an alkoxy group, an alkoxycarbonyl group, a cyano group, a nitro group or a substituent of Formula 7 below. Also, in another example, two neighboring substituents of $R_1$ to $R_5$ or two neighboring substituents of $R_6$ to $R_{10}$ may be bonded to each other to constitute a benzene ring substituted with -L-A-P. For example, when two neighboring substituents of $R_1$ to $R_5$ form benzene substituted with -L-A-P, a naphthalene structure substituted with -L-A-P can be realized on the left side in Formula 6 above when considering A to be the center, and when two neighboring substituents of $R_6$ to $R_{10}$ form benzene substituted with -L-A-P, a naphthalene structure substituted with -L-A-P can be realized on the right side in Formula 6 above when considering A to be the center. Here, L may be —C(=O)O—, —OC(=O)— or —OC(=O)O—, A may be an alkylene group, and P may be a polymerizable functional group. Here, the alkylene of A may be an alkylene group having 1 or more, 2 or more, 3 or more, or 4 or more carbon atoms, and the carbon number of the alkylene group may be 20 or less, 16 or less, 12 or less, or 8 or less. Also, here, the polymerizable functional group P may be an acryloyl group, a methacryloyl group, an acryloyloxy group or a methacryloyloxy group. Here, when two neighboring substituents of $R_1$ to $R_5$ or two neighboring substituents of $R_6$ to $R_{10}$ are bonded to each other to constitute the benzene ring, the remaining substituents may be hydrogen, halogen, an alkyl group, an alkoxy group, an alkoxycarbonyl group, a cyano group or a nitro group, as described above.

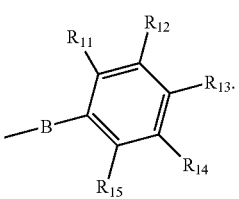

[Formula 7]

In Formula 7, B may be a single bond, —C(=O)O— or —OC(=O)—, and $R_{11}$ to $R_{15}$ may each independently be hydrogen, halogen, an alkyl group, an alkoxy group, an alkoxycarbonyl group, a cyano group, a nitro group or a -L'-A'-P' group, or two neighboring substituents of $R_{11}$ to $R_{15}$ may be bonded to each other to constitute a benzene ring substituted with -L'-A'-P', where the L' in the -L'-A'-P' is —C(=O)O—, —OC(=O)— or —OC(=O)O—, the A' in the -L'-A'-P' is an alkylene group and the P' in the -L'-A'-P' is an acryloyl group, a methacryloyl group, an acryloyloxy group or a methacryloyloxy group. In this case, the structure of Formula 7 has a naphthalene structure substituted with -L-A-P. Here, when two neighboring substituents of $R_{11}$ to $R_{15}$ are bonded to each other to constitute the benzene ring, the remaining substituents may be hydrogen, halogen, an alkyl group, an alkoxy group, an alkoxycarbonyl group, a cyano group or a nitro group, as described above.

The meaning of the single bond in Formulas 6 and 7 above is the same as the case of Formulas 1 to 5 above, and the meanings of the alkyl group and the alkoxy group are also the same as the case of Formulas 1 to 5 above.

In one example, as $R_2$ and $R_3$ or $R_3$ and $R_4$ in Formula 6 above form benzene substituted with an -L'-A'-P' group, a compound in which the left side of A in Formula 6 above forms a naphthalene structure can be used as the normal wavelength dispersion polymerizable liquid crystal compound.

As the normal wavelength dispersion polymerizable liquid crystal compound, a compound in which any one of $R_7$ to $R_9$ in Formula 6 above, for example, $R_8$ is Formula 7 above can also be used. In this case, as $R_{12}$ and $R_{13}$ or $R_{13}$ and $R_{14}$ in Formula 7 above form benzene substituted with the -L-A-P group, a compound in which the right side of B in Formula 7 above forms a naphthalene structure can be used.

The ratio of such a normal wavelength dispersion polymerizable liquid crystal compound in the cured layer (liquid crystal layer) is not particularly limited, as long as while the transmittance characteristic of the cured layer (liquid crystal layer) is maintained in the desired range, the optical properties such as the R (450)/R (550) value of the entire cured layer (liquid crystal layer) can be maintained in the desired range. For example, the normal wavelength dispersion polymerizable liquid crystal compound may be contained in a ratio of 0 to 60 weight % or a ratio of more than 0 weight % and 60 weight % or less. In another example, the ratio may also be about 55 weight % or less, 50 weight % or less, 45 weight % or less, 40 weight % or less, 35 weight % or less, 30 weight % or less, 25 weight % or less, 20 weight % or less, 15 weight % or less, 10 weight % or less, or 5 weight % or less or so. Within this range, the cured layer (liquid crystal layer) can exhibit suitable reverse wavelength dispersion characteristics and transmittance characteristics.

Therefore, the ratio of the normal wavelength dispersion polymerizable liquid crystal compound in the polymerizable liquid crystal composition may be within a range in which the normal wavelength dispersion polymerizable liquid crystal compound in the formed cured layer can be present in the above-mentioned range.

The cured layer (liquid crystal layer) may comprise polymerized units of a polymerizable liquid crystal compound having tri-functionality or more, for example, a polymerizable liquid crystal compound having 3 to 10, 3 to 8, 3 to 6, 3 to 5, 3 to 4, or 3 polymerizable functional groups. Such a polymerizable liquid crystal compound having tri-functionality or more may be the above-mentioned reverse wavelength dispersion or normal wavelength dispersion polymerizable liquid crystal compound. The ratio of polymerized units of the polymerizable liquid crystal compound in the cured layer (liquid crystal layer) is not particularly limited, but it may be, for example, 30 weight % or more, or 40 weight % or more and may be 100 weight % or less, or may be less than 100 weight %. The cured layer (liquid crystal layer) comprising polymerized units of the polymerizable liquid crystal compound having tri-functionality or more in such a ratio can exhibit more excellent durability.

In the cured layer (liquid crystal layer) of the polymerizable liquid crystal composition comprising the polymerizable liquid crystal compound as described above, the conversion ratio of the polymerizable liquid crystal compound, that is, the ratio of the polymerizable liquid crystal compound converted from the initial monomer state into the polymerized state may be, for example, 50 weight % to 100 weight % or so. In another example, the conversion ratio may be about 60 to 100 weight % or about 70 to 100 weight % or so. At such a conversion ratio, the cured layer (liquid crystal layer) can exhibit more excellent durability.

In particular, since the first retardation layer of the present application realizes the desired ultraviolet absorbing ability through application of normal wavelength dispersion and reverse wavelength dispersion polymerizable liquid crystal compounds having a specific structure without using an ultraviolet absorber or a light stabilizer, as described above, it can exhibit excellent durability.

For example, the first retardation layer may have an absolute value of the retardation change ratio according to the following equation A of about 17% or less, about 16.5% or less, about 16% or less, or about 15.5% or less. In another example, the retardation change ratio may be about 0% or more, 2% or more, 4% or more, 6% or more, 8% or more, 10% or more, 12% or more, or 14% or more.

Retardation change ratio=100×(Ra−Ri)/Ri.   [Equation A]

In Equation A, Ri is the initial in-plane retardation of the first retardation layer for light having a wavelength of 550 nm, and Ra is the in-plane retardation of the first retardation layer for light having a wavelength of 550 nm after an endurance condition.

Here, the endurance condition maintains the first retardation layer at 85° C., and specifically, the retardation change ratio can be measured by the method disclosed in the following examples. Here, the holding time at the endurance condition may be 50 hours or more, 100 hours or more, 150 hours or more, 200 hours or more, or 250 hours or more. In another example, the holding time may also be about 300 hours or less or so.

The thickness of such a first retardation layer is not particularly limited, and the thickness range of the known retardation layers may be applied in the present application. In one example, the first retardation layer may have a thickness in a range in which the desired retardation may be achieved according to Equation 4 and/or 5.

The polarizing plate of the present application may comprise the polarizer and the first retardation layer, and may further have a second retardation layer on the bottom and/or top of the first retardation layer.

Such a second retardation layer may be formed to be particularly useful, for example, when the polarizer is applied for antireflection in an organic light emitting device. Through the second retardation layer, display image quality such as antireflection characteristics and color senses at a tilt angle may be improved.

The second retardation layer may be a layer that satisfies the refractive index relationship of Equation 7 or 8 below:

$nx=ny<nz;$   [Equation 7]

$nx>ny$ and $nz>ny.$   [Equation 8]

In Equations 7 and 8, nx, ny, and nz are the same as defined in Equation 1 to 3 above.

The second retardation layer may have thickness direction retardation in a range of 10 to 400 nm. In another example, the thickness direction retardation may be 370 nm or less, 350 nm or less, 330 nm or less, 300 nm or less, 270 nm or less, 250 nm or less, 240 nm or less, 230 nm or less, 220 nm or less, 200 nm or less, 190 nm or less, 180 nm or less, 170 nm or less, 160 nm or less, 155 nm or less, 150 nm or less, 130 nm or less, 120 nm or less, 110 nm or less, 100 nm or less, 80 nm or less, or 70 nm or less. Also, in another example, the thickness direction retardation may be 5 nm or more, 10 nm or more, 20 nm or more, 40 nm or more, 50 nm or more, 90 nm or more, 100 nm or more, 110 nm or more, 120 nm or more, or 150 nm or more. It is possible to provide a circularly polarizing plate having excellent reflection characteristics and visual appreciation characteristics, in particular, reflection characteristics and visual appreciation characteristics at a tilt angle, by adjusting the thickness direction retardation of the second retardation layer as above.

When the second retardation layer satisfies Equation 8 above, the in-plane retardation thereof may be more than 0 nm, and may be, for example, 300 nm or less, 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm or less, 170 nm or less, 160 nm or less, 150 nm or less, 140 nm or less, 130 nm or less, 120 nm or less, 110 nm or less, 100 nm or less, 90 nm or less, 80 nm or less, 70 nm or less, 60 nm or less, 50 nm or less, 40 nm or less, 30 nm or less, 20 nm or less, or 10 nm or less.

When the second retardation layer satisfies Equation 8 above, the laminate film may be arranged such that its slow axis is perpendicular or horizontal to the absorption axis of the polarizer. In this specification, the term vertical, orthogonal, horizontal or parallel means substantially vertical, orthogonal, horizontal or parallel in a range that does not impair the desired effect. Therefore, the terms may each include, for example, an error within ±15 degrees, within ±10 degrees, within ±5 degrees, or within ±3 degrees.

The second retardation layer may have a characteristic that satisfies Equation 9 below:

$Rth(450)/Rth(550)<Rth(650)/Rth(550).$   [Equation 9]

In Equation 9, Rth (450) is the thickness direction retardation of the retardation layer for light having a wavelength of 450 nm, Rth (550) is the thickness direction retardation of the retardation layer for light having a wavelength of 550 nm, and Rth (650) is the thickness direction retardation of the retardation layer for light having a wavelength of 650 nm.

The thickness direction retardation may each be calculated according to Equation 5 as described above. However, the value of nz and ny used in Equation 5 to calculate the thickness direction retardation for light having a wavelength of 450 nm are the respective refractive indexes at 450 nm; as the values of nz and ny used in Equation 5 to calculate the thickness direction retardation for light having a wavelength of 550 nm are the respective refractive indexes at 550 nm; and as the values of nz and ny used in Equation 5 to calculate the thickness direction retardation for light having a wavelength of 650 nm are the respective refractive indexes at 650 nm.

The retardation layer satisfying Equation 9 may exhibit phase delay characteristics designed in a wide wavelength range.

The second retardation layer exhibiting such characteristics may be manufactured in various ways known in the art. For example, as in the case of the first retardation layer, a stretched polymer layer or liquid crystal layer obtained by stretching a polymer film capable of providing optical anisotropy by stretching in an appropriate manner may be used as the second retardation layer. As the liquid crystal layer, a liquid crystal polymer layer or a cured layer of a polymerizable liquid crystal compound may be used.

The cured layer of the polymerizable liquid crystal compound may be formed by polymerizing the above-described polymerizable liquid crystal compound in a vertically oriented state, and in this case, the second retardation layer may comprise a polymerized unit of the vertically oriented polymerizable liquid crystal compound. At this time, there is no limitation on the kind of the polymerizable liquid crystal compound which can be applied, and a kind known in the art can be applied. In one embodiment, the second retardation layer may be a vertically oriented liquid crystal layer having a polymerized unit of a vertically oriented polymerizable liquid crystal compound.

In addition, the liquid crystal layer satisfying Equation 9 may be formed by polymerizing the reverse wavelength dispersion polymerizable liquid crystal compound, or polymerizing the reverse wavelength dispersion polymerizable liquid crystal compound and the normal wavelength dispersion polymerizable liquid crystal compound, as described above, in a vertically oriented state.

The thickness of such a second retardation layer is not particularly limited, and the thickness range of the known retardation layer may be applied in the present application. In one example, the second retardation layer may have a thickness in a range in which the desired retardation may be secured according to Equation 4 and/or 5.

The polarizing plate may have an additional layer together with the polarizer, and the first and second retardation layers. For example, the polarizing plate may comprise an additional layer (hereinafter, outer layer) laminated on the opposite surface of the polarizer facing the first retardation layer.

As the type of the outer layer, a polarizer protective film, a hard coating layer, a retardation film, an antireflection layer or a liquid crystal coating layer, and the like can be exemplified, without being limited thereto. The specific type of each constitution used as the outer layer is not particularly limited, and for example, various kinds of films used for constituting a laminate film such as a polarizing plate in the industry can be used without limitation.

For example, the outer layer may be a film having in-plane retardation of 10 nm or less for light having a wavelength of 550 nm. The film may be an upper protective film of the polarizer. As the protective film, various films known in the art may be applied.

The polarizing plate may also have an additional layer between the first retardation layer and the polarizer. FIGS. 4 and 5 are examples of the structure, where FIG. 4 is a case in which the additional layer (400) exists between the polarizer (100) and the first retardation layer (200), and FIG. 5 is a case in which the additional layer (400) exists between the polarizer (100) and the second retardation layer (300).

The additional layer may be, for example, an isotropic film as a protective layer for the polarizer (100). The term isotropic film may be a film having an in-plane retardation according to Equation 4 above of 10 nm or less for light having a wavelength of 550 nm. In another example, the in-plane retardation may be 9 nm or less, 8 nm or less, 7 nm or less, 6 nm or less, 5 nm or less, 4 nm or less, 3 nm or less, 2 nm or less, or 1 nm or less, or may be substantially 0 nm or so.

The isotropic film may also have thickness direction retardation for light having wavelength of 550 nm according to Equation 5 above in a range of −60 nm to 10 nm.

In the industry, various kinds of isotropic films having the retardation as described above are known to be applied as a protective film of a polarizer, and in the present application, such a known film may be appropriately selected and applied.

In another example, the additional layer (400) may be a cured resin layer. In the field of manufacturing a polarizing plate, for formation of a thinner polarizing plate, a protective layer of a conventional polarizer is not applied and a resin layer showing high hardness is optionally applied instead of the protective film, where in the present application, such a resin layer may exist as the additional layer (400).

In another example, the first or second retardation layer may also be directly in contact with the polarizer, without any separate layer between the polarizer and the retardation layer. In this case, between the polarizer and the first or second retardation layer, no other layer may exist or an adhesive layer for adhesion may also exist.

In addition, the polarizing plate may further comprise, as an additional layer, a pressure-sensitive adhesive layer or an adhesive layer for attaching the polarizing plate to other components, or a protective film or a release film for protecting the pressure-sensitive adhesive layer or the adhesive layer on the bottom of the first and/or second retardation layer.

The present application is also directed to a display device. An exemplary display device may comprise the polarizing plate.

The specific kind of the display device comprising the polarizing plate is not particularly limited. The device may be, for example, a liquid crystal display such as a reflective type or semi-transmissive reflective type liquid crystal display, or may be an organic light emitting device or the like.

The arrangement type of the polarizing plate in the display device is not particularly limited, and for example, a known type may be adopted. For example, in a reflective type liquid crystal display, the polarizing plate can be used as any one polarizing plate among the polarizing plates of a liquid crystal panel for preventing reflection of external light and ensuring visibility.

When the polarizing plate is applied to the organic light emitting device, the organic light emitting device comprises a reflective electrode, a transparent electrode, an organic layer interposed between the reflective electrode and the transparent electrode and having a light emitting layer, and the polarizing plate, where the polarizing plate may be present outside the reflective or transparent electrode and the first and/or second retardation layer may be disposed closer to the reflective or transparent electrode than a polarizer.

The present application can provide a polarizing plate comprising a retardation layer exhibiting ultraviolet blocking characteristics even in a state where the retardation layer does not include any ultraviolet absorber or light stabilizer. In addition, the present application can provide a polarizing plate which can be used alone or in combination with an appropriate sunscreen or a light stabilizer as needed to selectively block ultraviolet rays in a region requiring blocking, without affecting display performance, such as color senses and image quality, of a display device, can also be formed thinly without requiring a separate ultraviolet blocking layer, and also has excellent durability, because the polarizing plate exhibits a certain ultraviolet blocking property even in the absence of an ultraviolet absorber or light stabilizer.

Hereinafter, the present application will be described in detail by way of examples and comparative examples, but the scope of the present application is not limited by the following transmittance-variable device.

Preparation Example 1. Preparation of Polymerizable Liquid Crystal Composition A A polymerizable liquid crystal composition was prepared using LC1057 liquid crystals of BASF Corporation as a normal wavelength dispersion polymerizable liquid crystal compound and a liquid crystal compound of Formula A below as a reverse wavelength dispersion liquid crystal compound. The normal wavelength dispersion polymerizable liquid crystal compound has R (450)/R (550) in a level of about 1.09 to 1.11 or so and R (650)/R (550) in a level of about 0.93 to 0.95 or so, and the liquid crystal compound of Formula A has R (450)/R (550) in a level of about 0.84 to 0.86 or so and R (650)/R (550) in a level of about 1.01 to 1.03 or so. The R (450), R (550) and R (650) are in-plane retardation for light having wavelengths of 450 nm, 550 nm and 650 nm, respectively, as measured with respect to a retardation layer formed by using the normal wavelength dispersion polymerizable liquid crystal compound or the polymerizable liquid crystal compound of Formula A alone. The in-plane retardation can be measured by a known method, and for example, it can be measured by a polarization measurement method using Axoscan (Axometrics), which is a birefringence meter. The method of forming the retardation layer by using the polymerizable liquid crystal compounds alone is the same as that described in the following examples, except that the polymerizable liquid crystal compounds are applied alone. The normal wavelength dispersion polymerizable liquid crystal compound and the reverse wavelength dispersion polymerizable liquid crystal compound of Formula A were mixed in a weight ratio of approximately 94:6 to 95:5 (reverse wavelength dispersion polymerizable liquid crystal:normal wavelength dispersion polymerizable liquid crystal) and about 5 parts by weight of a radical photoinitiator (BASF, Irgacure 907) relative to 100 parts by weight of the total of the polymerizable liquid crystal compounds was combined in a solvent (cyclopentanone) to prepare a polymerizable liquid crystal composition A.

[Formula A]

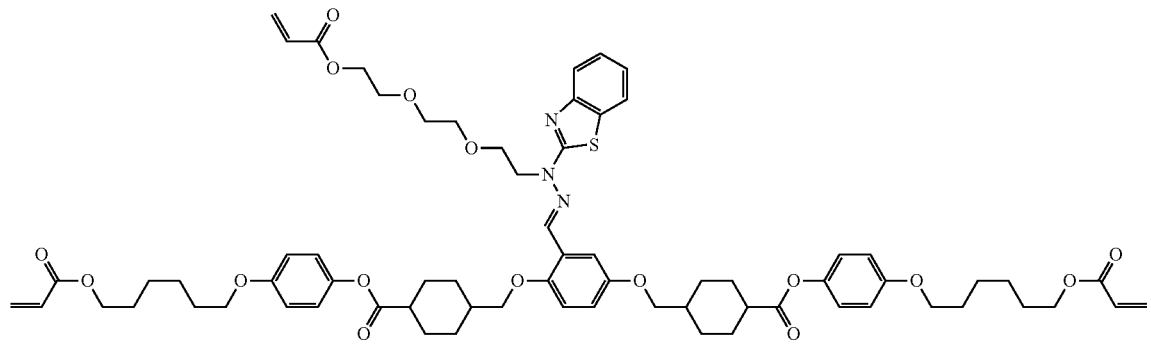

Here, the compound of Formula A was synthesized in the following manner. Under a nitrogen atmosphere, 17.7 g of a compound of Formula A1 below and 100 ml of tetrahydrofuran were placed in a reaction vessel. 103 ml of a 0.9 mol/L borane-tetrahydrofuran complex was dripped while cooling with ice and the mixture was stirred for 1 hour. After dripping 5% hydrochloric acid, the mixture was extracted with ethyl acetate and washed with a saline solution. The extract was dried over sodium sulfate and the solvent was distilled off to obtain 14.9 g of a compound represented by Formula A2 below. Under a nitrogen atmosphere, 14.9 g of the compound represented by Formula A2, 7.2 g of pyridine and 150 ml of dichloromethane were added to the reaction vessel. 8.8 g of methanesulfonyl chloride was dripped while cooling with ice and the mixture was stirred at room temperature for 3 hours. The reactant was poured into water, and washed sequentially with 5% hydrochloric acid and a saline solution. Purification was performed by column chromatography (silica gel, hexane/ethyl acetate) and recrystallization (acetone/hexane) to obtain 16.3 g of a compound represented by Formula A3 (in Formula A3 below, Ms is a methanesulfonyl group). Under a nitrogen atmosphere, 2.5 g of a compound represented by Formula A4, 10.6 g of the compound represented by Formula A3, 7.5 g of potassium carbonate and 70 ml of N,N-dimethylformamide were added to the reaction vessel and the mixture was heated and stirred at 90° C. for 3 days. The reactant was poured into water, extracted with toluene and washed with a saline solution. Purification was performed by column chromatography (silica gel, toluene) and recrystallization (acetone/methanol) to obtain 7.7 g of a compound represented by Formula A5. 7.7 g of the compound represented by Formula A5, 150 ml of dichloromethane and 100 ml of trifluoroacetic acid were added to the reaction vessel and stirred. After the solvent was distilled off, the resulting solid was washed with water and dried to obtain 5.5 g of a compound represented by Formula A6.

Under a nitrogen atmosphere, 5.5 g of the compound represented by Formula A6, 6.9 g of a compound represented by Formula A7, 0.8 g of N,N-dimethylaminopyridine and 200 ml of dichloromethane were added to the reaction vessel. 4.1 g of diisopropylcarbodiimide was dripped while cooling with ice and the mixture was stirred at room temperature for 10 hours. After the precipitate was removed by filtration, the filtrate was washed successively with 1% hydrochloric acid, water and a saline solution. After performing recrystallization (dichloromethane/methanol), purification was performed by column chromatography (silica gel, dichloromethane) and recrystallization (dichloromethane/methanol) to obtain 8.4 g of a compound represented by Formula A8.

1.4 g of the compound represented by Formula A8, 0.35 g of 2-hydrazinobenzothiazole and 5 ml of tetrahydrofuran were added to a 30 ml three-necked flask, and the mixture was stirred at 25° C. for 9 hours. Then, 50 ml of water was added, and the mixture was extracted twice with 30 ml of ethyl acetate. The resulting organic phase was dried with sodium sulfate. After sodium sulfate was filtered off, the organic phase was concentrated under reduced pressure. The resulting residue was purified by silica gel column chromatography (hexane/ethyl acetate=2/1). The resulting crude product was subjected to re-precipitation using acetone/methanol. These crystals were filtered and dried to obtain 0.98 g of a compound represented by Formula A9. Subsequently, the hydrogen atom attached to the nitrogen atom of the compound represented by Formula A9 was substituted with a 2-[2-(2-acryloyloxyethoxy)ethoxy]ethyl group to obtain the compound represented by Formula A. NMR confirmatory results of the resulting compound of Formula A were described below.

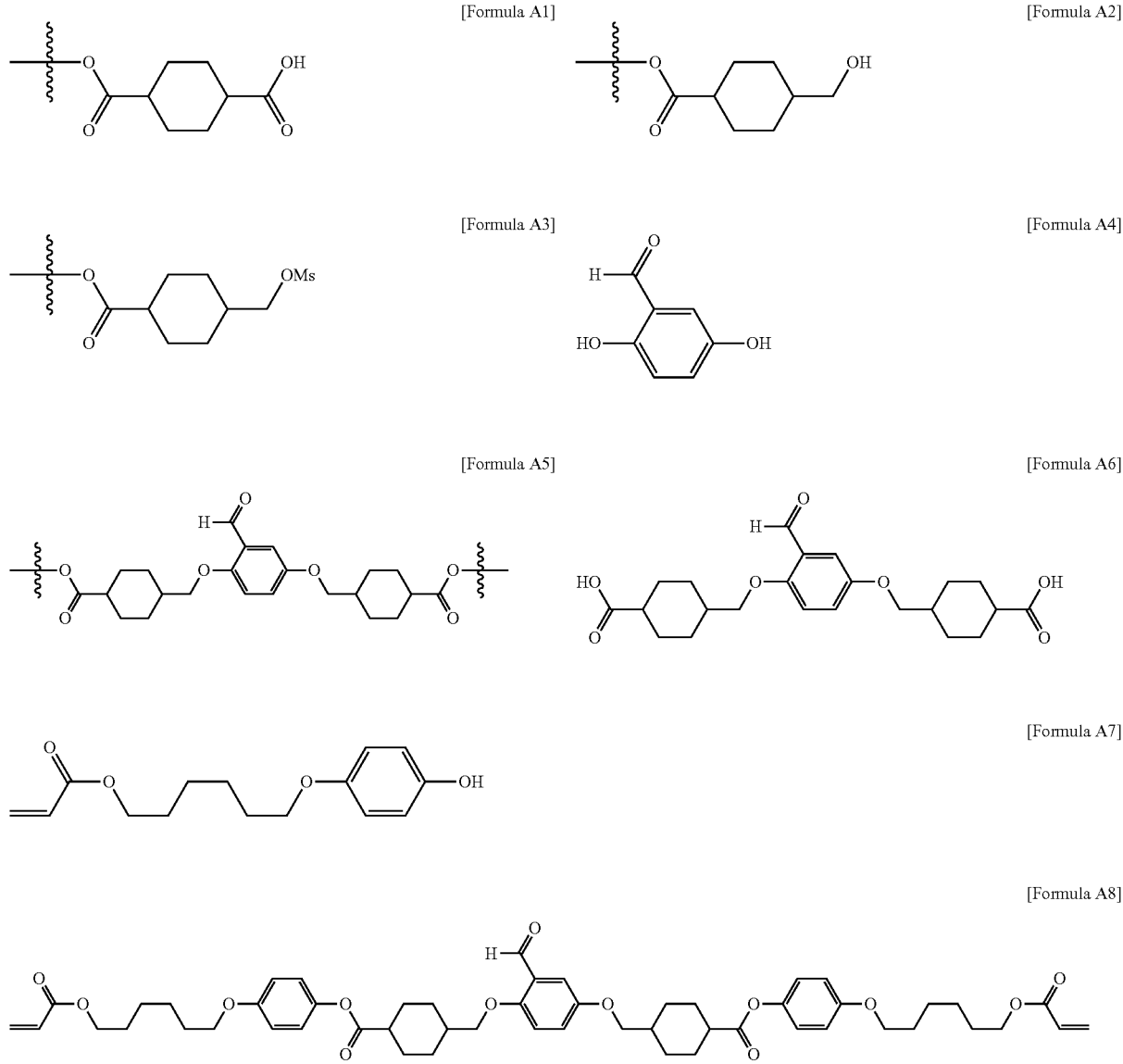

[Formula A9]

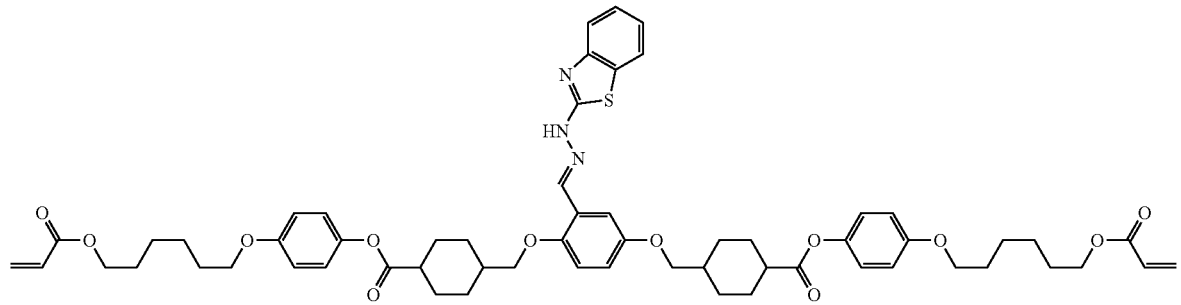

<NMR Results>
¹H NMR (CDCl₃) δ 1.19-1.29 (m, 4H), 1.41-1.82 (m, 22H), 1.91 (m, 2H), 2.08 (m, 4H), 2.24 (m, 4H), 2.53 (m, 2H), 3.62 (m, 3H), 3.67 (m, 2H), 3.84-3.90 (m, 5H), 3.94 (t, 4H), 4.15-4.19 (m, 6H), 4.53 (t, 2H), 5.76 (dd, 1H), 5.82 (dd, 2H), 6.08 (dd, 1H), 6.12 (dd, 2H), 6.37 (dd, 1H), 6.40 (dd, 2H), 6.84-6.90 (m, 6H), 6.95-6.98 (m, 4H), 7.14 (t, 1H), 7.32 (t, 1H), 7.53 (d, 1H), 7.65 (d, 1H), 7.69 (d, 1H), 8.34 (s, 1H) ppm.

Preparation Example 2. Preparation of Polymerizable Liquid Crystal Composition B A polymerizable liquid crystal composition B was prepared in the same manner as in Preparation Example 1, except that a liquid crystal compound of Formula B below was applied as the reverse wavelength dispersion polymerizable liquid crystal compound. The liquid crystal compound of Formula B has R (450)/R (550) in a level of about 0.81 to 0.83 or so and R (650)/R (550) in a level of about 1.01 to 1.03 or so. The R (450), R (550) and R (650) are in-plane retardation for light having wavelengths of 450 nm, 550 nm and 650 nm, as measured with respect to a retardation layer formed by using the polymerizable liquid crystal compound of Formula B alone.

<NMR Results>
¹H NMR (CDCl₃) δ 1.19-1.29 (m, 4H), 1.44-1.47 (m, 8H), 1.60-1.82 (m, 12H), 1.90 (m, 2H), 2.07 (t, 4H), 2.24 (d, 4H), 2.53 (m, 2H), 3.30 (s, 3H), 3.50 (t, 2H), 3.66 (t, 2H), 3.85-3.89 (m, 6H), 3.93 (t, 4H), 4.17 (t, 4H), 4.53 (t, 2H), 5.82 (d, 2H), 6.13 (q, 2H), 6.40 (d, 2H), 6.83-6.90 (m, 6H), 6.95-6.98 (m, 4H), 7.14 (t, 1H), 7.32 (t, 1H), 7.52 (t, 1H), 7.67 (t, 2H), 8.33 (s, 1H) ppm.

Preparation Example 3. Preparation of Polymerizable Liquid Crystal Composition C A polymerizable liquid crystal composition was prepared by applying the reverse wavelength dispersion polymerizable liquid crystal compound of Formula A in Preparation Example 1 above, the same photoinitiator as that used in Preparation Example 1 and an ultraviolet absorber (Orient Chemical Industries, BONASORB UA-3912) having a maximum absorption wavelength range of about 380 to 390 nm as an ultraviolet absorber. The reverse wavelength dispersion polymerizable liquid crystal compound of Formula A, the photoinitiator and the ultraviolet absorber were combined in a solvent (cyclopentanone) in a weight ratio of 20:1:1 (reverse wavelength dispersion polymerizable liquid crystal compound:photoinitiator:ultraviolet absorber) to prepare a polymerizable liquid crystal composition C.

[Formula B]

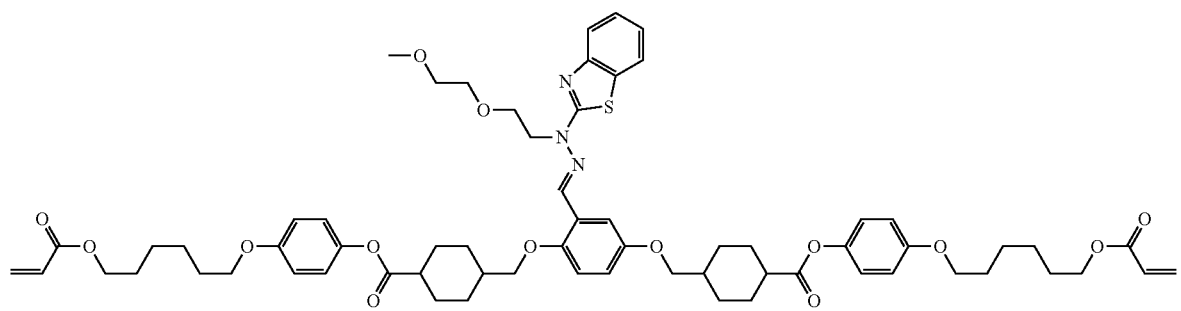

Here, the compound of the Formula B was obtained by obtaining a compound represented by Formula A9 below in the same manner as in Preparation Example 1 and then substituting the hydrogen atom attached to the nitrogen atom of the compound represented by Formula A9 with a 2-[2-(methoxyethoxy)]ethyl group. NMR confirmatory results of the resulting compound of Formula B were described below.

Preparation Example 4. Preparation of Polymerizable Liquid Crystal Composition D A polymerizable liquid crystal composition D was prepared in the same manner as in the case of Preparation Example 3, except that the reverse wavelength dispersion polymerizable liquid crystal compound of Formula A, the photoinitiator and the ultraviolet absorber were combined in a weight ratio of 20:1:0.6 (reverse wavelength dispersion polymerizable liquid crystal compound:photoinitiator:ultraviolet absorber).

Example 1

Production of First Retardation Layer

A photo-alignment film was formed on Fuji Film's NRT (no retardation triacetyl cellulose) film. A known cinnamate series composition for forming a photo-alignment film was applied on the NRT film to a thickness of about 100 nm or so and irradiated with linearly polarized ultraviolet rays at about 300 mW/cm$^2$ to form the alignment film. After the release treatment on the surface of the alignment film, the polymerizable liquid crystal composition A was applied to the release treatment surface on the alignment film so as to have a dry thickness of about 1 μm or so, oriented along the lower alignment film, and then irradiated with ultraviolet rays at about 300 mW/cm$^2$ for about 10 seconds to form a first retardation layer. The in-plane retardation of the first retardation layer for light having wavelength of 550 nm was about 146.0 nm or so. The formed first retardation layer had R (450)/R (550) in a level of about 0.85 to 0.87 or so and R (650)/R (550) in a level of about 1.01 to 1.05 or so.

Production of Polarizing Plate

In the structure that a protective film is formed on one side of a known iodine-based PVA (poly(vinyl alcohol)) polarizer (LG Chemical Co., Ltd.), the first retardation layer was attached to the surface of the polarizer, in which the protective film is not formed, through an adhesive layer. At this time, after attaching the first retardation layer, only the first retardation layer was attached to the polarizer by removing the alignment film and the NRT film from the release treatment surface. Thereafter, as a known vertically oriented liquid crystal layer, a vertically oriented liquid crystal layer having in-plane retardation of substantially 0 nm and having thickness direction retardation in a range of approximately 60 to 90 nm was attached to the bottom of the first retardation layer in the same transfer manner as in the first retardation layer and a pressure-sensitive adhesive layer was formed on the bottom thereof to produce a polarizing plate.

Example 2

Production of First Retardation Layer

A first retardation layer was formed in the same manner as in Example 1, except that the polymerizable liquid crystal composition B was applied instead of the polymerizable liquid crystal composition A. The in-plane retardation of the first retardation layer for light having wavelength of 550 nm was about 144.5 nm. The formed first retardation layer had R (450)/R (550) in a level of about 0.82 to 0.85 or so and R (650)/R (550) in a level of about 1.01 to 1.05 or so.

Production of Polarizing Plate

A polarizing plate was produced in the same manner as in Example 1, using the produced retardation layer.

Comparative Example 1

Production of Retardation Layer

A first retardation layer was formed in the same manner as in Example 1, except that the polymerizable liquid crystal composition C was applied instead of the polymerizable liquid crystal composition A. The in-plane retardation of the produced first retardation layer for light having wavelength of 550 nm was about 131.7 nm. The formed first retardation layer had R (450)/R (550) in a level of about 0.84 to 0.86 or so and R (650)/R (550) in a level of about 1.01 to 1.03 or so.

Production of Polarizing Plate

A polarizing plate was produced in the same manner as in Example 1, using the produced first retardation layer.

Comparative Example 2

Production of Retardation Layer

A first retardation layer was formed in the same manner as in Example 1, except that the polymerizable liquid crystal composition D was applied instead of the polymerizable liquid crystal composition A. The in-plane retardation of the retardation layer for light having wavelength of 550 nm was about 140.7 nm. The formed first retardation layer had R (450)/R (550) in a level of about 0.81 to 0.83 or so and R (650)/R (550) in a level of about 1.01 to 1.03 or so.

Production of Polarizing Plate

A polarizing plate was produced in the same manner as in Example 1, using the produced retardation layer.

Evaluation 1. Comparison of Ultraviolet Absorption Characteristics.

The ultraviolet absorption characteristics of each of the first retardation layers produced in Examples and Comparative Examples were compared. The ultraviolet absorption characteristics for each wavelength were evaluated for a specimen that an alignment film and a liquid crystal layer (first retardation layer) were sequentially formed on an NRT film (transmittance for 385 nm: 90.8%, transmittance for 390 nm: 91.1%, transmittance for 395 nm: 91.2% or transmittance for 400 nm: 91.4%) base material which did not exhibit any absorption peak in wavelength region of 300 nm or more by a method shown in each of Examples and Comparative Examples by using N&K UV Spectrometer (HP). FIGS. 6 and 7 are measurement results for Examples 1 and 2, respectively, and FIGS. 8 and 9 are measurement results for Comparative Examples 1 and 2, respectively. The specific transmittance for each wavelength was summarized in Table 1 below.

TABLE 1

| | Transmittance (unit: %) | | | |
|---|---|---|---|---|
| | 385 nm | 390 nm | 395 nm | 400 nm |
| Example 1 | 1.7 | 3.7 | 10.4 | 27.0 |
| Example 2 | 1.7 | 3.8 | 10.5 | 27.2 |
| Comparative Example 1 | 0.5 | 0.9 | 2.6 | 7.0 |
| Comparative Example 2 | 0.7 | 1.6 | 4.3 | 11.6 |

From Table 1, it can be confirmed that the present application can achieve superior ultraviolet blocking properties without applying an ultraviolet absorber.

Evaluation 2. Durability Evaluation.

Durability was evaluated for each of the first retardation layers produced in Examples and Comparative Examples. The durability was evaluated by maintaining each of the first retardation layers produced in Examples and Comparative Examples at a condition of about 85° C. (endurance condition) for 250 hours, and then comparing the in-plane retardation (based on wavelength of 550 nm) before maintaining the condition and the in-plane retardation (based on wavelength of 550 nm) after maintaining the condition. FIGS. 10 and 11 are measurement results for Examples 1 and 2, respectively and FIGS. 12 and 13 are measurement results for Comparative Examples 1 and 2, respectively.

TABLE 2

| | In-plane retardation (based on wavelength of 550 nm) | | |
|---|---|---|---|
| | Before maintaining endurance condition | After maintaining endurance condition | Change amount |
| Example 1 | 146.0 nm | 123.8 nm | −15.2% |
| Example 2 | 144.5 nm | 123.8 nm | −14.8% |
| Comparative Example 1 | 131.7 nm | 101.7 nm | −22.8% |
| Comparative Example 2 | 140.7 nm | 113.6 nm | −19.3% |

From the results of Table 2, in the case of the retardation layer according to the present application, it can be confirmed that it has excellent ultraviolet absorbing ability without using an ultraviolet absorber or a light stabilizer and also as a result, shows excellent results in terms of durability.

The invention claimed is:

1. A polarizing plate comprising:
a polarizer;
a first retardation layer positioned on a surface of the polarizer,
wherein the first retardation layer comprises a polymerized unit of a normal wavelength dispersion polymerizable liquid crystal compound and a polymerized unit of a reverse wavelength dispersion polymerizable liquid crystal compound, wherein the first retardation layer does not comprise an ultraviolet absorber, and has a transmittance of 3% or less with respect to light having a wavelength of 385 nm, and a transmittance of greater than 3% with respect to light having a wavelength of 390 nm; and
a second retardation layer positioned on a surface of the first retardation layer that is opposite to the polarizer;
wherein the reverse wavelength dispersion polymerizable liquid crystal compound is represented by Formula 1 below:

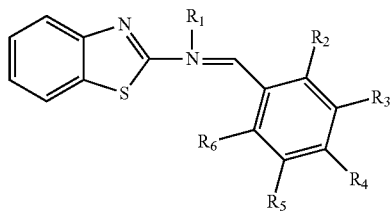

[Formula 1]

wherein in Formula 1, $R_1$ is a substituent of Formula 2 or 3 below, and $R_2$ to $R_6$ are each independently hydrogen, an alkyl group, an alkoxy group, a cyano group, a substituent of Formula 4 below or a substituent of Formula 5 below with the proviso that at least two of $R_2$ to $R_6$ are substituents of Formula 4 below or substituents of Formula 5 below, -$A_1$-$L_1$-Cyc-$A_2$-$L_2$-P, [Formula 2]

wherein, in Formula 2, $A_1$ and $A_2$ are each independently an oxygen atom or a single bond, $L_1$ and $L_2$ are each independently —C(=O)—O—, —O—C(=O)— or an alkylene group, Cyc is an arylene group or a cycloalkylene group, and P is an acryloyl group, a methacryloyl group, an acryloyloxy group or a methacryloyloxy group,

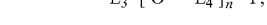

[Formula 3]

wherein, in Formula 3, $L_3$ and $L_4$ are each an alkylene group, n is a number in a range of 1 to 4, and P is an acryloyl group, a methacryloyl group, an acryloyloxy group, a methacryloyloxy group or a hydrogen atom, -$A_3$-$L_5$-Cyc-$A_4$-$L_6$-P, [Formula 4]

wherein in Formula 4, $A_3$ and $A_4$ are an oxygen atom, an alkylene group or a single bond, $L_5$ and $L_6$ are each independently —C(=O)—O—, —O—C(=O)— or an alkylene group, Cyc is an arylene group, and P is an acryloyl group, a methacryloyl group, an acryloyloxy group or a methacryloyloxy group, -$A_5$-$L_7$-$Cy_1$-$A_6$-$L_8$-$Cy_2$-$A_7$-$L_9$-P, [Formula 5]

wherein in Formula 5, $A_5$, $A_6$ and $A_7$ are each independently an oxygen atom or a single bond, $L_7$, $L_8$ and $L_9$ are each independently —C(=O)—O—, —O—C(=O)— or an alkylene group, $Cy_1$ is a cycloalkylene group, $Cy_2$ is an arylene group, and P is an acryloyl group, a methacryloyl group, an acryloyloxy group or a methacryloyloxy group; and wherein the normal wavelength dispersion polymerizable liquid crystal compound is represented by Formula 6 below:

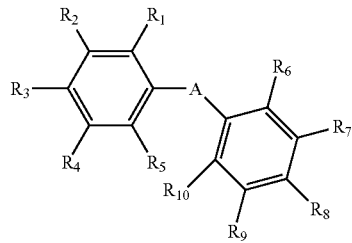

[Formula 6]

wherein in Formula 6, A is a single bond, —C(=O)O— or —OC(=O)— and $R_1$ to $R_{10}$ are each independently hydrogen, halogen, an alkyl group, an alkoxy group, an alkoxycarbonyl group, a cyano group, a nitro group or a substituent of Formula 7 below, or two neighboring substituents of $R_1$ to $R_5$ or two neighboring substituents of $R_6$ to $R_{10}$ are bonded to each other to constitute a benzene ring substituted with an -L-A-P group, wherein in the -L-A-P group, L is —C(=O)O—, —OC(=O)— or —OC(=O)O—, A is an alkylene group and P is an acryloyl group, a methacryloyl group, an acryloyloxy group or a methacryloyloxy group,

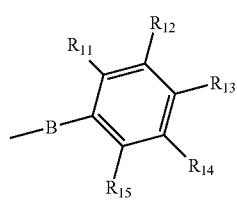

[Formula 7]

wherein in Formula 7, B is a single bond, —C(=O)O— or —OC(=O)— and $R_{11}$ to $R_{15}$ are each independently hydrogen, halogen, an alkyl group, an alkoxy group, an alkoxycarbonyl group, a cyano group, a nitro group or -L'-A'-P', or two neighboring substituents of $R_{11}$ to $R_{15}$ are bonded to each other to constitute a benzene ring substituted with an -L'-A'-P' group, wherein in the -L'-A'-P' group, L' is —C(=O)O—, —OC(=O)— or —OC(=O)O—, A' is an alkylene group and P' is an acryloyl group, a methacryloyl group, an acryloyloxy group or a methacryloyloxy group.

2. The polarizing plate according to claim 1, wherein the first retardation layer has an absolute value of a retardation change ratio of 17% or less, wherein the retardation change ratio is calculated according to Equation A:

Retardation change ratio=100×(*Ra*−*Ri*)/*Ri*, [Equation A]

Wherein in Equation A, Ri is an initial in-plane retardation of the first retardation layer for light having a wavelength of 550 nm, and Ra is an in-plane retardation of the first retardation layer for light having a wavelength of 550 nm after an endurance condition, wherein the endurance condition comprises maintaining the first retardation layer at a temperature of 85° C. for 50 hours or more.

3. The polarizing plate according to claim 1, wherein the second retardation layer is a vertically oriented liquid crystal layer having a polymerized unit of a vertically oriented polymerizable liquid crystal compound.

4. The polarizing plate according to claim 3, wherein the vertically oriented polymerizable liquid crystal compound is a reverse wavelength dispersion polymerizable liquid crystal compound.

5. The polarizing plate according to claim 1, further comprising an isotropic film between the polarizer and the first retardation layer.

6. The polarizing plate according to claim 1, further comprising a cured resin layer between the polarizer and the first retardation layer.

7. The polarizing plate according to claim 1, wherein the first retardation layer is directly attached to the polarizer.

8. The polarizing plate according to claim 1, further comprising a pressure-sensitive adhesive layer on a surface of the second retardation layer opposite to the first retardation layer.

9. The polarizing plate according to claim 1, further comprising a protective film on the top of the polarizer.

10. A display device comprising the polarizing plate of claim 1.

* * * * *